United States Patent
Huang et al.

(10) Patent No.: US 10,473,213 B2
(45) Date of Patent: Nov. 12, 2019

(54) METHOD OF CONTROLLING CLAMPING OF WEDGE-ACTUATED CVT AND POWERTRAIN WITH WEDGE-ACTUATED CVT

(71) Applicant: GM GLOBAL TECHNOLOGY OPERATIONS LLC, Detroit, MI (US)

(72) Inventors: Ying Huang, Shanghai (CN); Chunhao J. Lee, Troy, MI (US); Jian Yao, Shanghai (CN); Chengwu Duan, Shanghai (CN)

(73) Assignee: GM Global Technology Operations LLC, Detroit, MI (US)

( * ) Notice: Subject to any disclaimer, the term of this patent is extended or adjusted under 35 U.S.C. 154(b) by 109 days.

(21) Appl. No.: 15/829,294

(22) Filed: Dec. 1, 2017

(65) Prior Publication Data

US 2019/0170249 A1 Jun. 6, 2019

(51) Int. Cl.
| | |
|---|---|
| *F16H 9/18* | (2006.01) |
| *F16H 61/662* | (2006.01) |
| *B60W 20/00* | (2016.01) |
| *B60W 10/107* | (2012.01) |
| *F16H 59/14* | (2006.01) |
| *F16H 59/42* | (2006.01) |

(Continued)

(52) U.S. Cl.
CPC ..... *F16H 61/66272* (2013.01); *B60W 10/107* (2013.01); *B60W 20/00* (2013.01); *B60Y 2200/92* (2013.01); *F16H 59/14* (2013.01); *F16H 59/40* (2013.01); *F16H 59/42* (2013.01); *F16H 59/46* (2013.01); *F16H 59/48* (2013.01); *F16H 59/54* (2013.01); *F16H 59/70* (2013.01); *F16H 2059/147* (2013.01); *F16H 2059/465* (2013.01); *F16H 2059/704* (2013.01); *F16H 2059/708* (2013.01); *F16H 2061/66277* (2013.01); *Y10S 903/945* (2013.01)

(58) Field of Classification Search
CPC .................. F16H 9/18; F16H 2061/66277
See application file for complete search history.

(56) References Cited

U.S. PATENT DOCUMENTS

| | | | |
|---|---|---|---|
| 4,515,041 A | 5/1985 | Frank et al. | |
| 4,735,598 A * | 4/1988 | Moroto ................. | F16H 63/067 474/29 |

(Continued)

FOREIGN PATENT DOCUMENTS

EP          1048879 B1     6/2004

*Primary Examiner* — David R Morris
(74) *Attorney, Agent, or Firm* — Quinn IP Law

(57) ABSTRACT

A method of controlling a continuously variable transmission includes monitoring powertrain operating conditions, and calculating, via an electronic controller, a commanded clamping force based on the powertrain operating conditions, wherein the commanded clamping force includes a commanded clamping force of an input pulley and a commanded clamping force of an output pulley on the endless rotatable device. The method also includes activating, via the electronic controller, at least one of the input actuator and the output actuator such that an axial component of the input wedge force and the axial force of the input actuator together provide the commanded clamping force of the input pulley, and an axial component of the output wedge force and the axial force of the output actuator together provide the commanded clamping force of the output pulley.

19 Claims, 19 Drawing Sheets

(51) Int. Cl.
*F16H 59/40* (2006.01)
*F16H 59/46* (2006.01)
*F16H 59/48* (2006.01)
*F16H 59/54* (2006.01)
*F16H 59/70* (2006.01)

(56) References Cited

U.S. PATENT DOCUMENTS

| | | | |
|---|---|---|---|
| 5,157,992 A | 10/1992 | Hayashi et al. | |
| 5,184,981 A * | 2/1993 | Wittke | F16H 61/66272 474/18 |
| 5,540,048 A | 7/1996 | Larkin et al. | |
| 6,387,000 B1 | 5/2002 | Eisenbacher et al. | |
| 6,413,178 B1 | 7/2002 | Chamberland | |
| 6,669,588 B2 | 12/2003 | Schmid | |
| 7,207,920 B2 | 4/2007 | Jonsson et al. | |
| 7,637,836 B2 | 12/2009 | Watanabe et al. | |
| 7,670,243 B2 | 3/2010 | Miller | |
| 7,686,715 B2 | 3/2010 | Carlson et al. | |
| 7,988,573 B2 * | 8/2011 | Shioiri | F16H 61/66272 474/18 |
| 8,858,389 B2 | 10/2014 | Lundberg et al. | |
| 9,261,187 B1 | 2/2016 | Otanez | |
| 9,777,810 B2 * | 10/2017 | Kawakami | F16H 9/18 |
| 10,054,202 B2 | 8/2018 | Yokoyama | |
| 10,267,391 B2 * | 4/2019 | Yao | F16H 9/18 |
| 2002/0063000 A1 * | 5/2002 | Kojima | B60K 6/48 180/65.1 |
| 2005/0090367 A1 * | 4/2005 | Jonsson | F16H 61/66259 477/44 |
| 2005/0233842 A1 * | 10/2005 | Shioiri | F16H 61/66272 474/19 |
| 2006/0009321 A1 * | 1/2006 | Carlson | F16H 63/065 474/18 |
| 2010/0081526 A1 | 4/2010 | Kossack | |
| 2010/0113201 A1 | 5/2010 | Lannutti | |
| 2013/0116073 A1 | 5/2013 | Liebel et al. | |
| 2013/0196815 A1 * | 8/2013 | Lundberg | F16H 63/065 476/9 |
| 2015/0167802 A1 | 6/2015 | Yoshida et al. | |
| 2016/0131230 A1 * | 5/2016 | Kawakami | F16H 9/18 474/28 |
| 2016/0281847 A1 | 9/2016 | Kanayama | |
| 2017/0363184 A1 * | 12/2017 | Yao | F16H 9/18 |
| 2018/0080529 A1 * | 3/2018 | Yao | F16H 57/12 |
| 2019/0170231 A1 | 6/2019 | Duan et al. | |

\* cited by examiner

METHOD OF CONTROLLING CLAMPING OF WEDGE-ACTUATED CVT AND POWERTRAIN WITH WEDGE-ACTUATED CVT

TECHNICAL FIELD

The present teachings generally include a method of controlling a continuously variable transmission and a powertrain that includes a continuously variable transmission.

BACKGROUND

Continuously variable transmissions vary a groove width of an input pulley and a groove width of an output pulley to vary the speed ratio of an input shaft to an output shaft. The groove width is typically varied by a hydraulic actuator that moves an axially-movable sheave of the pulley.

SUMMARY

A wedge actuated CVT may significantly reduce hydraulic line pressure in comparison to a CVT completely reliant on hydraulic actuators, thus improving mechanical efficiency as a result of reduced pump loss.

Due to its smaller packaging space requirements than a dual-direction wedge actuator, a single-direction wedge actuator is provided, and is designed to provide a wedge force on the positive input torques. When input torque to the CVT turns negative, such as during tip off/engine braking or in reverse gear in "behind the planetary" configuration, the single direction wedge actuator does not provide a wedge force, and a linear actuator provides an axial force to hold the endless rotatable device in frictional contact with the pulley. An electronic controller ensures that the clamping force to the CVT is sufficient even under these powertrain operating conditions, such that slip is avoided.

In a hybrid powertrain, engine torque may vary such as during engine braking, when an electric machine, such as a generator or a motor/generator, operatively connected to the crankshaft is controlled to function as a generator placing a torque load opposite to the drive load on the crankshaft. In such operating conditions, the wedge force may decrease, and the wedge surface may separate from the ramp surface. A controllable actuating mechanism provides a requisite axial force under such operating conditions to achieve, together with the axial component of the wedge force, a clamping force to achieves a desired transmission ratio (e.g., a target ratio).

A method of controlling a continuously variable transmission (CVT) is provided that enables a relatively low clamping force actuation requirement, thereby improving transmission efficiency. The CVT includes an input wedge component mounted on an input shaft. The input wedge component is configured to provide an input wedge force on an input movable sheave of an input pulley when a direction of torque on the input shaft is in a forward drive direction. The CVT also includes an output wedge component mounted on an output shaft. The output wedge component is configured to provide an output wedge force on an output movable sheave of an output pulley when a direction of load torque on the output shaft is opposite to the forward drive direction. Stated differently, the input wedge component and the output wedge component are configured so that they automatically provide the input wedge force and the output wedge force due to the direction of the drive torque and the direction of the load torque. For example, the angle of a wedge surface of the input wedge component and of the output wedge component is such that the wedge forces have an axial component that is inward toward the respective movable sheave, thereby increasing the input and output clamping forces. The output pulley is connected with the input pulley via an endless rotatable device such that the output shaft is driven via the input shaft. The CVT includes an input actuator operable to provide an axial force on the input movable sheave, and an output actuator operable to provide an axial force on the output movable sheave.

The method comprises monitoring powertrain operating conditions, and calculating, via an electronic controller, a commanded clamping force based on the powertrain operating conditions. The commanded clamping force includes a commanded clamping force of the input pulley and a commanded clamping force of the output pulley on the endless rotatable device. The method also includes activating, via the electronic controller, at least one of the input actuator and the output actuator such that an axial component of the input wedge force and the axial force of the input actuator together provide the commanded clamping force of the input pulley, and an axial component of the output wedge force and the axial force of the output actuator together provide the commanded clamping force of the output pulley. In other words, the electronic controller provides an additional axial force complementing the axial component of the wedge force at the input actuator and at the output actuator as needed to meet the commanded clamping forces given the powertrain operating conditions.

In an aspect of the disclosure, a target speed ratio (or torque ratio) of the CVT (referred to herein as a target ratio) may be determined from the monitored powertrain operating conditions. For example, the controller may include a stored ratio map, such as a table of ratios corresponding with powertrain operating conditions. The table may be compiled from test data. The commanded clamping force may be the clamping force needed to achieve that ratio in the ratio map that corresponds with the monitored powertrain operating conditions (i.e., the target ratio). For example, the target ratio may be that which allows an engine driving the input shaft of the CVT to operate at its most efficient operating point.

In an aspect of the disclosure, the powertrain includes an engine operable to provide drive torque on the input shaft, and an electric machine operatively connected to the engine. Monitoring powertrain operating conditions includes monitoring at least one of engine torque and a mode of operation of the electric machine. For example, the electric machine may be operated as a generator during engine braking to help slow the crankshaft, converting kinetic energy into stored electrical energy. The activation of the input actuator and/or the output actuator is adjusted accordingly so that the respective commanded clamping force is achieved under these changing powertrain operating conditions.

In another aspect of the disclosure, the powertrain includes a gearing arrangement connected between the engine and the input shaft and operable to reverse a direction of drive torque on the input shaft during a reverse operating mode. Monitoring powertrain operating conditions includes monitoring the direction of the drive torque on the input shaft. In the reverse operating mode, with the reversed direction of drive torque on the input shaft and due to the angles of the wedge surfaces of the wedge components, the input wedge component and the output wedge component do not provide axial wedge forces that contribute to the respective commanded clamping forces. Accordingly, if the controller determines that the powertrain is operating in the reverse operating mode, the activation of the input actuator and the output actuator is increased such that the actuators alone provide the respective commanded clamping forces.

In an aspect of the disclosure, the powertrain includes a gear shift lever, such as a "PRNDL" shift lever (e.g., a lever that has park, reverse, neutral, drive, and, optionally, low positions). Monitoring powertrain operating conditions includes monitoring a position of a gear shift lever. The position of the gear shift lever affects at least the input torque and the corresponding wedge force, and thereby affects the axial force that should be provided by the actuators.

Similarly, in an aspect of the disclosure, monitoring powertrain operating conditions includes monitoring braking and deceleration of a vehicle propelled by the powertrain. For example, a position of a brake pedal may be monitored, and a rate of change of position of a gas pedal may be monitored as it may correlate with deceleration. Such changes in driver input affect the input wedge force and the output wedge force, correspond to the commanded input clamping force and the commanded output clamping force, and therefore indicate the portion of such that should be provided by the actuators.

In an aspect of the disclosure, the method includes calculating the axial component of the input wedge force of the input wedge component based on estimated drive torque on the input shaft, an angle of a wedge surface of the input wedge component that interfaces with the input movable sheave, an angle of a pulley surface of the input movable sheave, and an outer radius of the input wedge component as follows:

$$F_{wedge\ axial} = T_{drive}/(R_{wedge} * \tan(\alpha)\cos(\beta))$$

where $F_{wedge\ axial}$ is the axial component of the wedge force of the wedge component; $T_{drive}$ is the forward drive torque on the shaft; $R_{wedge}$ is the radius of the wedge component as measured from the axis of rotation (corresponding to either the input axis or the output axis); $\alpha$ is the angle of the wedge surface relative to a line perpendicular to the axis of rotation; and $\beta$ is the angle of the pulley surface relative to the line perpendicular to the axis of rotation.

The axial component of the output wedge force may be calculated according to corresponding features of the output pulley and output wedge component.

Instead of or in addition to calculating the axial component of the input wedge force, in an aspect of the disclosure, the input wedge force may be measured via a force sensor mounted on a wedge surface of the input wedge component that interfaces with the input movable sheave of the input pulley. The axial component of the output wedge force may be measured via a force sensor mounted on a wedge surface of the output wedge component that interfaces with the output movable sheave of the output pulley.

In some embodiments, the input wedge force or the output wedge force may be controllable. For example, the input wedge component may have a wedge surface disposed at an angle to an axis of rotation of the input shaft. The angle may vary along a length of the wedge surface. Because the axial component of the input wedge force is dependent on the angle, activating the at least one of the input actuator and the output actuator may include positioning differently angled portions of the wedge surface against a ramp surface of the movable input sheave to control the axial component of the input wedge force. Stated differently, activation by the electronic controller may include positioning the input wedge component so that the angle of the wedge surface that interfaces with the ramp surface results in the axial component of the input wedge force that when added to the axial force of the activated input actuator achieves the commanded input clamping force.

In an aspect of the disclosure, monitoring powertrain operating conditions includes one or more of monitoring torque on the input shaft, torque on the output shaft, rotational speed of the input shaft, rotational speed of the output shaft, position of the endless rotatable device on the input pulley, position of the endless rotatable device on the output pulley, and transmission slip. Each of these powertrain operating conditions affect the axial component of the wedge force of the input wedge component or of the output wedge component, and therefore the activation of the input actuator or the output actuator to provide a corresponding axial force to achieve the respective commanded clamping force.

In some embodiments, at least one of the input actuator and the output actuator may be a hydraulic actuator, in which case the method may further comprise monitoring hydraulic pressure supplied to the hydraulic actuator. In some embodiments, at least one of the input actuator and the output actuator may be an electric linear screw, in which case the method may further comprise adjusting a position of the linear screw.

A powertrain includes a continuously variable transmission (CVT) that includes an input wedge component mounted on an input shaft. The input wedge component is configured to provide an input wedge force on an input movable sheave of an input pulley when a direction of torque on the input shaft is in a forward drive direction. The CVT includes an output wedge component mounted on an output shaft. The output wedge component is configured to provide an output wedge force on an output movable sheave of an output pulley when a direction of load torque on the output shaft is opposite to the forward drive direction. The output pulley is connected with the input pulley via an endless rotatable device. The CVT also includes an input actuator operable to provide an axial force on the input movable sheave, and an output actuator operable to provide an axial force on the output movable sheave. An electronic controller is operatively connected to the CVT and is configured to monitor powertrain operating conditions, and calculate a commanded clamping force based on the powertrain operating conditions. The commanded clamping force includes a commanded clamping force of the input pulley on the endless rotatable device, and a commanded clamping force of the output pulley on the endless rotatable device. The method includes activating at least one of the input actuator and the output actuator such that an axial component of the input wedge force and the axial force of the input actuator together provide the commanded clamping force of the input pulley, and an axial component of the output wedge force and the axial force of the output actuator together provide the commanded clamping force of the output pulley.

In some embodiments, the powertrain includes an engine operable to provide drive torque on the input shaft, and an electric machine operatively connected to the engine, and the powertrain operating conditions monitored by the controller include at least one of engine torque and a mode of operation of the electric machine as a generator during engine braking.

In some embodiments, the powertrain includes a gearing arrangement connected between the engine and the input shaft and operable to reverse the direction of drive torque on the input shaft during a reverse operating mode. The powertrain operating conditions monitored by the controller include the direction of drive torque on the input shaft.

In some embodiments, the powertrain includes a gear shift lever, and the powertrain operating conditions monitored by the controller include a position of the gear shift lever.

In some embodiments, the electronic controller is configured to calculate the axial component of the input wedge force of the input wedge component based on estimated drive torque on the input shaft, an angle of a wedge surface of the input wedge component that interfaces with the input movable sheave, an angle of a pulley surface of the input movable sheave, and an outer radius of the input wedge component.

In some embodiments, the powertrain includes a force sensor mounted on a wedge surface of the input wedge component that interfaces with the input movable sheave of the input pulley. The electronic controller is operatively connected to the force sensor and is configured to determine the input wedge force via the force sensor.

In some embodiments, the input wedge component has a wedge surface disposed at an angle to the axis of rotation. The angle varies along a length of the wedge surface. The electronic controller is configured to activate the at least one of the input actuator and the output actuator by positioning differently angled portions of the wedge surface against a ramp surface of the movable input sheave to control the axial component of the input wedge force.

In some embodiments, the powertrain operating conditions monitored by the electronic controller include one or more of actual torque on the input shaft, actual torque on the output shaft, rotational speed of the input shaft, rotational speed of the output shaft, position of the endless rotatable device on the input pulley, position of the endless rotatable device on the output pulley, and transmission slip.

The above features and advantages and other features and advantages of the present teachings are readily apparent from the following detailed description of the best modes for carrying out the present teachings when taken in connection with the accompanying drawings.

DETAILED DESCRIPTION

Figure 1:
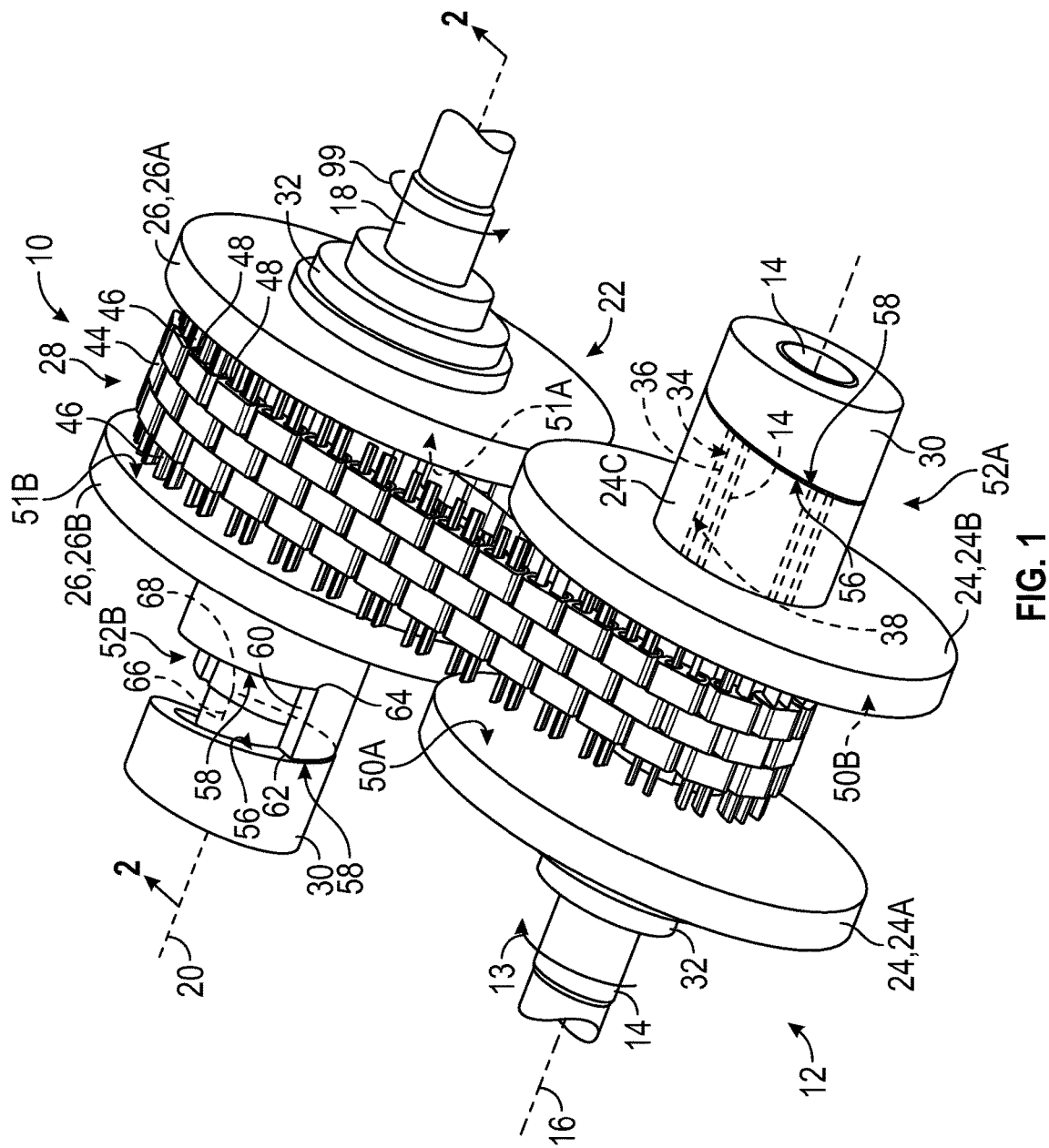
FIG. 1 is a schematic perspective illustration in partial fragmentary view of a first embodiment of a continuously variable transmission (CVT) with wedge actuators.

Referring to the drawings, wherein like components are referred to with like reference numbers, FIG. 1 shows a continuously variable transmission (CVT) 10 for a powertrain 12 of a mobile platform, such as a vehicle powertrain. The mobile platform, including by way of non-limiting examples, may be a passenger vehicle, a light-duty or heavy-duty truck, a utility vehicle, an agricultural vehicle, an industrial/warehouse vehicle, a recreational off-road vehicle, a robotic device, or an aeronautic device. The CVT 10 includes an input shaft 14 rotatable about an input axis 16, and an output shaft 18 rotatable about an output axis 20. The output axis 20 is also referred to herein as a first axis of rotation, and the input axis 16 is referred to herein as a second axis of rotation. The input axis 16 and the output axis 20 are generally parallel with one another. The powertrain 12 includes a power source (not shown) such as an engine that is operatively connected to drive the input shaft 14. The power source provides a driving torque 13 on the input shaft 14. The powertrain 12 may also include a load, such as the weight of the vehicle, (also referred to as a torque load 99 which is opposite to the direction of the driving torque 13), at vehicle wheels (not shown) which load acts on the output shaft 18. The input shaft 14 may be referred to as a drive shaft and the output shaft 18 may be referred to as a driven shaft.

The CVT 10 includes a variator assembly 22 that enables a controlled, continuously variable speed ratio between the input shaft 14 and the output shaft 18, and serves to transfer torque from the input shaft 14 to the output shaft 18. The variator assembly 22 includes an input pulley 24, an output pulley 26, and an endless rotatable device 28. The input pulley 24 is rotatably supported by the input shaft 14. Stated differently, the input pulley 24 is supported on the input shaft 14 and can rotate about the input axis 16. The input pulley 24 generally rotates about the input axis 16 with the input shaft 14, but is not fixed for common rotation with the input shaft 14 and can be controlled to have some rotation relative to the input shaft 14 as described herein.

As best shown in FIG. 1, the input pulley 24 includes an axially-fixed sheave 24A and an axially-movable sheave 24B. The axially-fixed sheave 24A is positioned between an axially-fixed wedge component 30, described herein, and an axially-fixed thrust bearing 32, also described herein, and thus is substantially constrained from axial movement relative to the input shaft 14 (i.e., in a direction along the input axis). The axially-movable sheave 24B is splined to an outer surface 34 of a shaft 36 of the axially-fixed sheave 24A at an inner surface 38 of the axially-movable sheave 24B, as best shown with respect to the similar components of the output pulley 26 shown and described with respect to FIG. 2. The shaft 36 of the axially-fixed sheave 24A radially surrounds the input shaft 14, extending through the endless rotatable device 28 and through an inner diameter of a shaft 24C of the axially-movable sheave 24B. Both the axially-movable sheave 24B and the axially-fixed sheave 24A can be controlled to rotate in unison (i.e., together at the same speed) slightly relative to the input shaft 14 while the axially-movable sheave 24B moves axially along the input axis 16 to control a speed ratio of the input shaft 14 to the output shaft 18 and to control a clamping force of the endless rotatable device 28 on the input pulley 24, using the mechanical advantage of a wedge as described herein.

Figure 2:
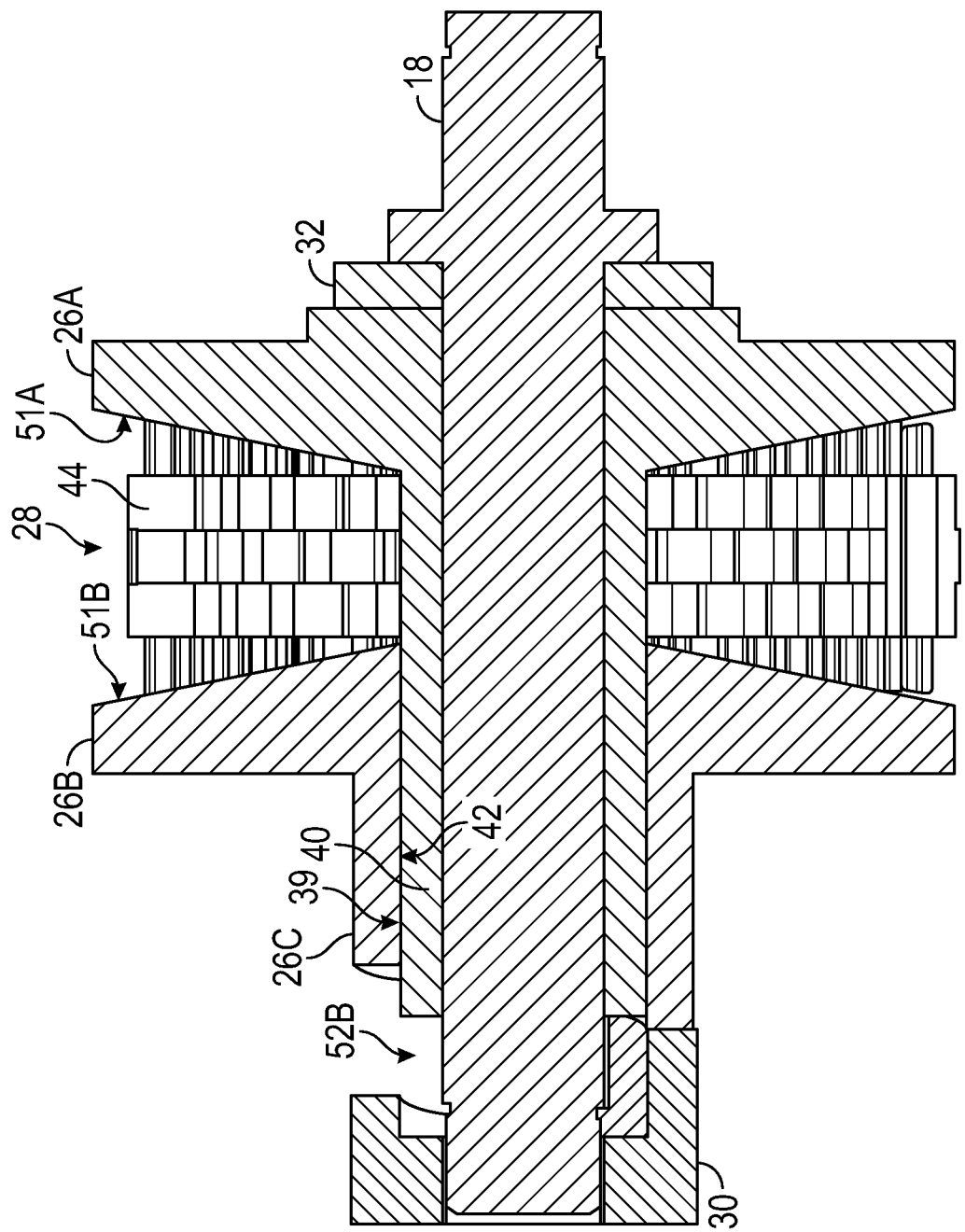
FIG. 2 is a schematic cross-sectional illustration of the CVT of FIG. 1 taken at lines 2-2 in FIG. 1

The output pulley 26 is rotatably supported by the output shaft 18. Stated differently, the output pulley 26 is supported on the output shaft 18 and can rotate about the output axis 20. The output pulley 26 generally rotates about the output axis 20 with the output shaft 18, but is not fixed for common rotation with the output shaft 18 and can be controlled to have some rotation relative to the output shaft 18 as described herein. As best shown in FIG. 2, the output pulley 26 includes an axially-fixed sheave 26A and an axially-movable sheave 26B. The axially-fixed sheave 26A is positioned between an axially-fixed wedge component 30, described herein, and an axially-fixed thrust bearing 32, also described herein, and thus is substantially constrained from axial movement relative to the output shaft 18 (i.e., in a direction along the output axis 20). The axially-fixed wedge component 30 and the axially-fixed thrust bearing 32 are identical to those disposed on the input shaft 14. Similar to the axially-movable sheave 24B of the input pulley 24, the axially-movable sheave 26B is splined to an outer surface 39 of a shaft 40 of the axially-fixed sheave 26A at an inner surface 42 of the axially-movable sheave 26B. The axially-movable sheave 26B includes a pulley shaft 26C that is splined to and extends along the shaft 40 of the axially-fixed sheave 26A. Both the axially-movable sheave 26B and the axially-fixed sheave 26A can be controlled to rotate in unison (i.e., together at the same speed) slightly relative to the output shaft 18.

The endless rotatable device 28 is frictionally engaged with the input pulley 24 and with the output pulley 26. As shown, the endless rotatable device 28 includes a chain 44 that carries pins 46 in openings 48 extending through links of the chain 44. The pins 46 frictionally engage with facing frustoconical surfaces 50A, 50B, 51A, 51B of the sheaves 24A, 24B, 26A, 26B of the respective pulleys 24, 26. The frustoconical surfaces 50A, 50B define a groove of the input pulley 24, and the frustoconical surfaces 51A, 51B define a groove of the output pulley 26. Alternatively, the endless rotatable device 28 could be a belt having overlapping steel bands held by blocks having angled surfaces that interface with the pulleys 24, 26. A person of ordinary skill in the art will readily understand the construction of various suitable chains and pulleys configured for use as endless rotatable devices in a CVT.

Figure 3:
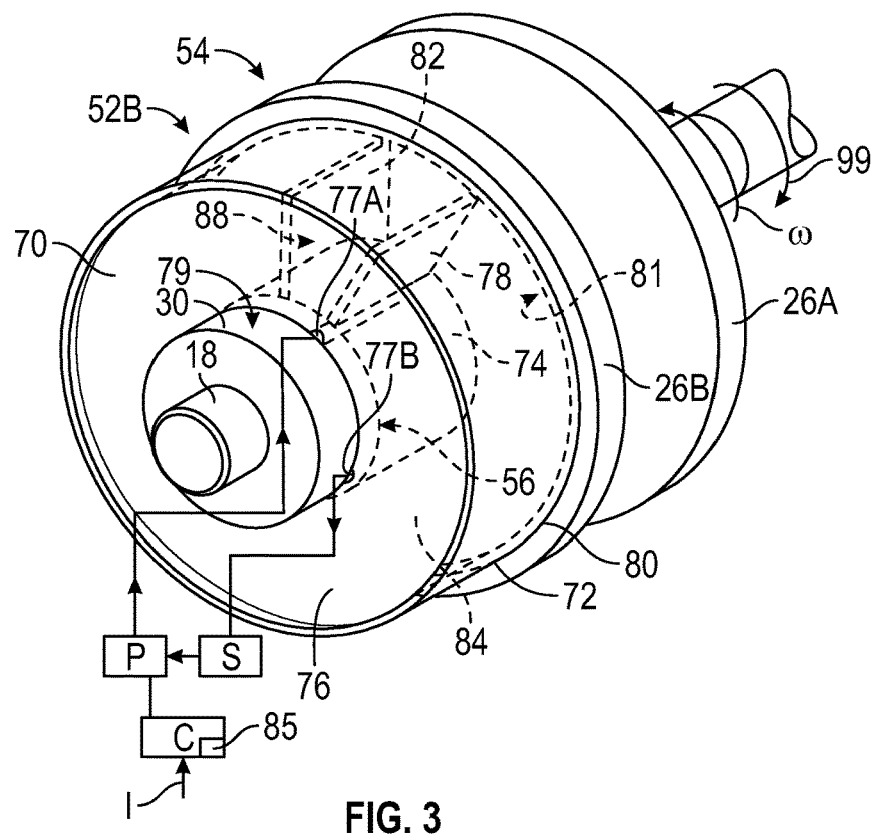
FIG. 3 is a schematic perspective illustration in partial fragmentary view of a portion of the CVT of FIG. 1 showing a rotary piston.
Figure 4:
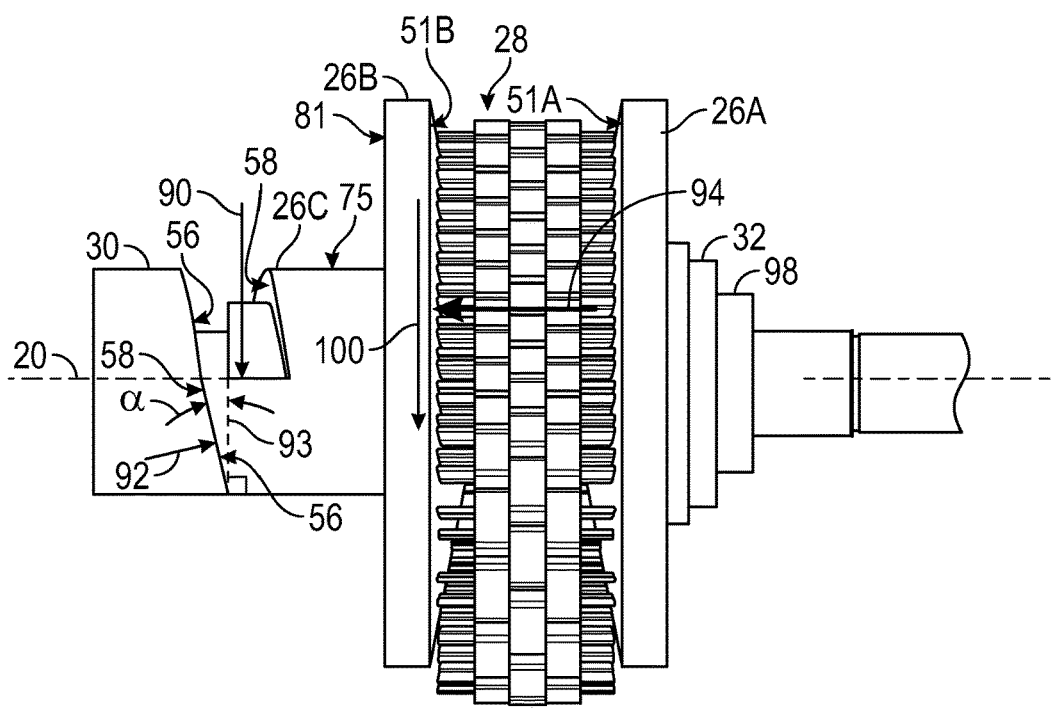
FIG. 4 is a schematic side view illustration in fragmentary view of the CVT of FIG. 1.

The CVT 10 includes an input actuator mechanism 52A operatively connected to the input pulley 24, and an identical output actuator mechanism 52B operatively connected to the output pulley 26. Each of the input actuator mechanism 52A and the output actuator mechanism 52B includes a wedge component 30 and a rotary piston 54. Only the wedge component 30 portion of each of the actuator mechanisms 52A, 52B is shown in FIG. 1, and the rotary pistons 54 are not shown in FIG. 1. The wedge component 30 of the output actuator mechanism 52B is also shown in FIGS. 2-4. The rotary piston 54 is shown in FIG. 3. The output actuator mechanism 52B is controllable to cause slight rotation of the output pulley 26 relative to the output shaft 18 and utilize the mechanical advantage of a wedge to increase clamping force of the endless rotatable device 28 on the pulley 26, adjusting the groove width to change the speed ratio while eliminating slippage. The input actuator mechanism 52A is configured and functions in an identical manner with respect to the input pulley 24 as the output actuator mechanism 52B is configured and functions with respect to the output pulley 26.

The output actuator mechanism 52B includes a wedge component 30 that has a wedge surface 56 interfacing with a ramp surface 58 of the pulley shaft 26C of the output pulley 26. The wedge surface 56 and the ramp surface 58 both incline in an axial direction along the output axis 20 toward the endless rotatable device 28. In the embodiment shown, the surfaces 56, 58 incline along a cylindrical outer diameter of the wedge component 30 and of the output shaft pulley 26C, respectively (i.e., toward the right in FIG. 4). More specifically, surface 56 extends in a helix one turn completely around the perimeter of the wedge component 30, and surface 58 extends in a helix one turn around the perimeter of the pulley shaft 26C. The wedge component 30 and the output pulley shaft 26C each have a step in the axial direction between the beginning and the end of each helical surface 56, 58. FIG. 1 shows a step 60 between the beginning 62 and the end 64 of the ramp surface 58. The beginning 66 and the end 68 of the helical wedge surface 56 of the wedge component 30 are blocked from view and are represented in hidden lines in FIG. 1.

As best shown in FIG. 3, the rotary piston 54 of the output actuator mechanism 52B is operatively connected to the wedge component 30. In the embodiment of FIGS. 1-4, the rotary piston 54 includes a stationary component 70 splined to the wedge component 30 and a rotary component 72 fixed to the axially-movable sheave 26B. The stationary component 70 includes a hollow cylindrical portion 74 that mounts to the outer surface 75 of the pulley shaft 40 and partway over the outer surface 79 of the wedge component 30. The stationary component 70 also includes a radial flange 76 extending radially-outward from the cylindrical portion 74. A vane 78 extends radially outward from the cylindrical portion 74 and is fixed to the cylindrical portion 74. The stationary component 70 is referred to as stationary because it is splined to the output shaft 18 to rotate in unison with the shaft and cannot rotate relative to the output shaft 18.

The rotary component 72 includes a cylindrical cover 80 fixed at one end to the axially-movable sheave 26B. A vane 82 extends radially inward from an inner surface of the cylindrical cover 80. The stationary component 70 and the rotary component 72 enclose a cylindrical volume between the cover 80 and the cylindrical portion 74 and between the flange 76 and the outer side surface 81 of the axially-movable sheave 26B. The vanes 78, 82 are sized to extend radially from the cylindrical portion 74 to the cylindrical cover 80 in the cylindrical volume. The vane 82 can rotate toward or away from the stationary vane 78 as the rotary component 72 rotates with the pulley 26 relative to the shaft 18. Because the wedge component 30 causes the rotary component 72 of the rotary piston 54 to move axially with the axially-movable sheave 26B as the rotary component 72 rotates, the rotary component 72 slides axially with the cover 80, and the cover 80 also pulls the axially-moveable radial flange 76 of the stationary component 70 to move axially while rotated slightly relative to the cover 80.

As best shown in FIG. 3, a first fluid chamber 84 is defined by the rotary piston 54. The first fluid chamber 84 is defined from the stationary vane 78 clockwise to the rotatable vane 82 in FIG. 3. The first fluid chamber 84 is a portion of the cylindrical volume (i.e., that portion from the fixed vane to the rotatable vane in the clockwise direction). The first fluid chamber 84 is pressurizable with a fluid to apply a rotational force on the movable vane 82. More specifically, the radial flange 76 includes a first aperture 77A and a second aperture 77B both at an inner diameter of the radial flange 76. The apertures 77A, 77B serve as a fluid inlet and as a fluid outlet, respectively. The pressurized fluid level in the first fluid chamber 84 is controlled by an electronic controller C that receives operating parameters I such as driving torque 13 on the input shaft 14, torque load 99 on the output shaft 18, driver torque demand, etc. The controller C includes a processor 85 that is configured to execute stored instructions that, based on the input I, controls a pump P that provides fluid from a fluid source S to control the volume of fluid in the fluid chamber 84, and hence the pressure on the face 88 of the vane 82 exposed to the fluid. The rotational force applied by the rotary piston 54 on the axially-movable pulley 26B is equal to fluid pressure times the surface area of the face 88 of the movable vane 82 exposed to the pressurized fluid. The rotational force urges the axially-movable pulley sheave 26B (and the axially-fixed pulley sheave 26A splined thereto) to rotate slightly (i.e., less than a full rotation) relative to the output shaft 18 and the fixed vane 78. This rotation provides relative motion between the ramp surface 58 and the wedge surface 56, resulting in a wedge force $F_{wedge}$ 92 on the ramp surface 58 and a clamping force $F_{clamp}$ 94 of the endless rotatable device 28 on the pulley 26, both indicated in FIG. 4. It should be appreciated that a clamping force of the endless rotatable device 28 on the pulley 26 or pulley 24 is equal and opposite to a clamping force of the pulley 26 or 24 on the endless rotatable device 28.

The mechanical advantage of the wedge component 30 is the friction force $F_{friction}$ 100 between the endless rotatable device 28 and the frustoconical surface 51B of the output pulley 26 and has the same direction with the piston force $F_{piston}$ 90, thus the friction force $F_{friction}$ 100 helps the piston force $F_{piston}$ 90 to reduce the required actuation force. More specifically, as best shown in FIG. 4, the piston force $F_{piston}$ 90 (i.e., the rotary force of the rotary piston 54) results in a wedge force $F_{wedge}$ 92 due to the angle α of the ramp surface 58 and of the wedge surface 56 relative to a line 93 that is perpendicular to the output axis 20. The wedge force $F_{wedge}$ 92 is normal to the ramp surface 58 and has an axial component that results in axial movement of the movable sheave 26B and a clamping force $F_{clamp}$ 94 of the endless rotatable device 28 against the output pulley 26. The thrust bearing 32 positioned between the axially-fixed sheave 26A and a fixed flange 98 of the output shaft 18 reacts the axial force. The torque load 99 on the output shaft 18 is indicated as being opposite to the direction of rotation ω of the output shaft 18. A friction force $F_{friction}$ 100 between the endless rotatable device 28 and the frustoconical surface 51B of the output pulley 26 is the product of the clamping force $F_{clamp}$ and the coefficient of friction μ between the endless rotatable device 28 and the frustoconical surface 51B of the axially-movable output sheave 26B. The endless rotatable device 28 also creates a friction force along the surface 51A of the axially-fixed sheave 26A of the output pulley 26. A force balance equation of forces acting on the axially-movable sheave 26B is simplified as follows:

$$F_{piston}/F_{clamp} = \tan \alpha - \mu; \quad \text{(EQUATION 1)}$$

where $F_{piston}$ is the rotational force 90 of the pressurized fluid on the rotary component 72 of the rotary piston 54, $F_{clamp}$ is the resulting clamping force 100 of the rotary component 72 against the axially-movable sheave 26B; α is the angle of the wedge surface 56 (and of the ramp surface 58) relative to the line 93 perpendicular to the output axis 20; and μ is the coefficient of friction between the endless rotatable device 28 and the frustoconical surface 51B of the axially-movable sheave 26B. The coefficient of friction μ is dependent on the materials of these components.

As is apparent from the above EQUATION 1, the $F_{piston}$ to maintain the clamping force $F_{clamp}$ can be very small or reduced to zero if the wedge angle is selected so that tan α is very close to or equal to the coefficient of friction μ. Stated differently, the fluid pressure in the fluid chamber 84 can be very small or reduced to zero while maintaining the axial position of the axially-movable sheave 26B after the axial position of the axially-movable sheave 26B is adjusted by the rotary piston 54 to establish a controlled position of the output pulley with a desired speed ratio between the input shaft 14 and the output shaft 18. This reduces pumping energy requirements in comparison to an actuator mechanism that requires a very high actuating fluid pressure to be maintained throughout the operation of the CVT 10 at the established speed ratio. Accordingly, the wedge surface 56, the output pulley 26, and the endless rotatable device 28 are configured so that a fluid pressure of zero in the first fluid chamber maintains a controlled position of the output pulley.

The torque load 99 on the output shaft 18, such as due to the vehicle load will normally be opposite to the direction of rotation of the input shaft 14 and the output shaft 18 (i.e., opposite to the direction of drive torque 13, which may be considered a first direction of rotation), and opposite to the direction of rotation of the rotary component 72 of the rotary piston 54 (i.e., opposite to the direction of relative rotation of the axially-movable pulley sheave 26B). The torque load 99 is thus in the same rotational direction as a rotary component of the wedge force $F_{wedge}$ 92 and thus reinforces the wedge force $F_{wedge}$ 92 against the axially-movable pulley sheave 26B. In a situation where the torque load 99 is in the same direction as the piston force $F_{piston}$ 90, such as when vehicle wheels operatively connected to the output shaft 18 encounter a pothole, or during engine braking, the torque load on the output shaft 18 could be in the same direction as the piston force $F_{piston}$ 90, in which case the fluid pressure can be controllably increased to maintain a wedge force $F_{wedge}$ 92 on the axially-movable pulley sheave 26B.

Referring again to FIG. 1, the axially-movable sheave 24B of the input pulley 24 also has a ramp surface 58 that inclines in an axial direction along the second axis (i.e., the input axis 16) toward the endless rotatable device 28. The endless rotatable device 28 is frictionally engaged with the input pulley 24. The input wedge component 30 has a wedge surface 56 interfacing with the ramp surface 58 of the pulley shaft 24C the axially-movable sheave 24B. The wedge surface 56 and the ramp surface 58 of the input actuator mechanism 52A are configured and function as described with respect to the wedge surface 56 and the ramp surface 58 of the output actuator mechanism 52B. An input rotary piston (not shown) identical to the rotary piston 54 of the output actuator mechanism 52B is operatively connected to the input wedge component 30 and to the axially-movable sheave 24B and defines another fluid chamber pressurizable to apply a rotational force that provides relative motion between the ramp surface 58 of the axially-movable sheave 24B and the wedge surface 56 of the input wedge component 30 resulting in a wedge force on the ramp surface 58 of the input pulley shaft 24C and a clamping force of the endless rotatable device 28 on the input pulley 24 as described with respect to the output actuator mechanism 52B and the output pulley 26.

The input actuator mechanism 52A and the output actuator mechanism 52B can be controlled by the controller C to move the axially-movable sheaves 24B, 26B in response to operating conditions I to vary the speed ratio of the input pulley 24 to the output pulley 26. The controller C will control the fluid pressure to the fluid chamber of the input actuator mechanism 52A so that the net axial force resulting from a clamping force of the endless rotatable device 28 on the pulley 24 and the axial component of the wedge force on the axially-movable pulley sheave 24B causes the axially-movable pulley sheave 24B to move closer to the axially-fixed pulley sheave 24A if the axially-movable pulley sheave 26B is controlled to move further from the pulley sheave 26A, and further from the pulley sheave 24A if the pulley sheave 26B is controlled to move closer to the pulley sheave 26A.

Figure 5:
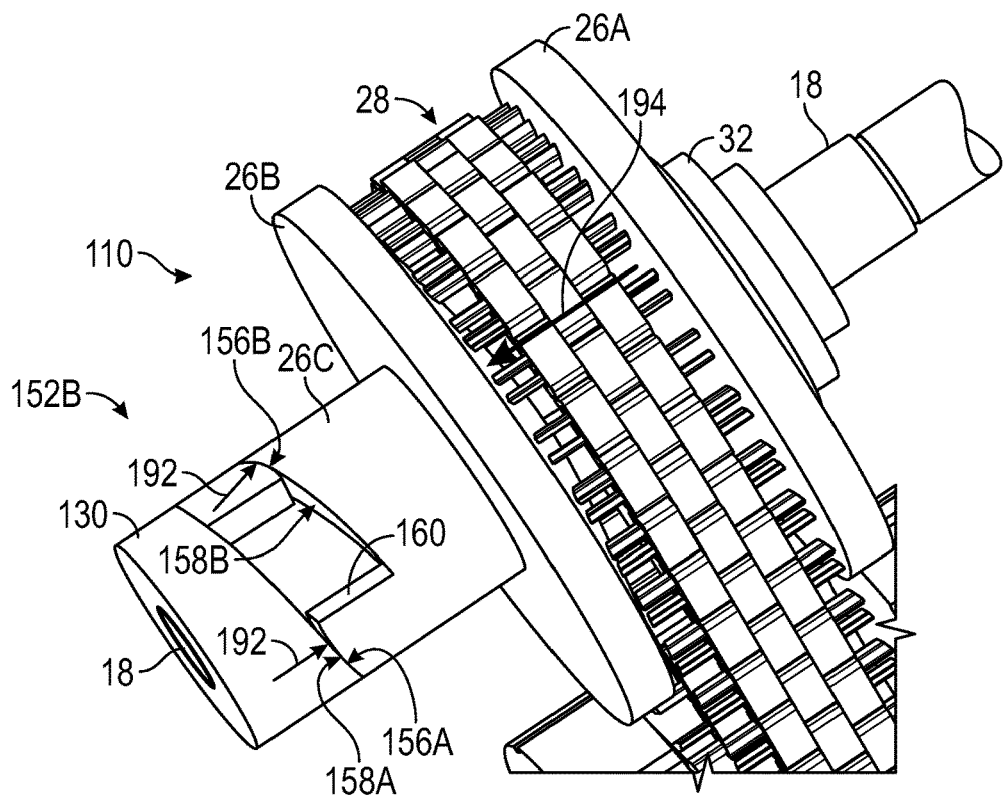
FIG. 5 is a schematic perspective illustration in partial fragmentary view of a second embodiment of a CVT with a dual wedge actuator in accordance with an alternative aspect of the present teachings.

FIG. 5 shows a portion of an alternative embodiment of a CVT 110 alike in all aspects to the CVT 10 except that an output actuator mechanism 152B (and an identical input actuator mechanism (not shown)) is modified to include a dual-wedge surface wedge component, a dual-ramp surface pulley shaft, and a two-chamber rotary piston 254 (FIG. 6) controlled by the controller C as in FIG. 5. More specifically, as shown with respect to output actuator mechanism 152B, the pulley shaft 26C has two helical ramp surfaces 158A and 158B. Unlike ramp surface 58 which winds one complete turn about the pulley shaft 26C, each of the helical ramp surfaces 158A, 158B winds only one-half way (i.e., 180 degrees) about the shaft 26C, with the ramp surface 158A starting at a rotational position at which ramp surface 158B ends and vice versa. In other words, the ramp surfaces 158A, 158B start at the same axial position 180 degrees apart from one another. For that reason, there are two steps 160 positioned 180 degrees apart from one another (only one step 160 is visible in FIG. 5).

The output actuator mechanism 152B also includes a wedge component 130 fixed to the output shaft 18 such that the wedge component 130 rotates in unison with the output shaft 18 and cannot rotate relative to the output shaft 18. The wedge component 130 is alike in all aspects to the wedge component 30, except it includes two helical wedge surfaces 156A, 156B that interface with ramp surfaces 158A and 158B, respectively. The wedge surfaces 156A, 156B of the wedge component 130 is a double helix, while the wedge surface 56 of the wedge component 30 is a single helix. Each wedge surface 156A and 156B and each ramp surface 158A, 158B must have twice the pitch as the wedge surface 56 and the ramp surface 58 in FIG. 1 in order for the axial range of movement of the pulley sheave 26B to be the same (i.e., to have the same length of the step 60 in the axial direction).

In order for a wedge force to provide a force component in the axial direction of equal magnitude to the axial force provided by the wedge force 92 of the embodiment of FIG. 1, the wedge force 192 acting on the ramp surfaces 158A, 158B must be twice that of the wedge force 92. This requires twice the actuation force. Accordingly, a rotary piston included in the output actuator mechanism 152B must have twice the rotary force as that of rotary piston 54. This can be accomplished by using a rotary piston like rotary piston 54 but having a second stationary vane 78 and a second rotary vane 82 that are 180 degrees apart from those shown in FIG. 1 to create two separate hydraulic chambers 84A, 84B as shown with respect to the embodiment of rotary piston 254 of FIG. 6. By including a second vane 82, there is twice as much total surface area that the fluid pressure acts on. A second pair of apertures 77A, 77B is provided in the radial flange 76 (FIG. 3) to enable fluid flow into and out of the second fluid chamber 84B. The second fluid chamber 84B thus increases the total area against which fluid pressure acts, thereby resulting in an additional rotational force, increasing the piston force, resulting in a wedge force 192 at each of the ramp surfaces 158A, 158B so that the sum of the wedge forces 192 is twice the magnitude to the wedge force 92 of FIG. 4. Because of the increased pitch of a double helix wedge component 130, the angle $\alpha$ of the ramp surface 58 and of the wedge surface 56 relative to a line 93 that is perpendicular to the output axis 20 is twice as large in the embodiments with dual chamber pistons. The axial component of the larger wedge force 192 will thus be the same as in the embodiment with a single wedge chamber and a single wedge surface. The wedge forces 192 result in a clamping force 194.

Figure 6:
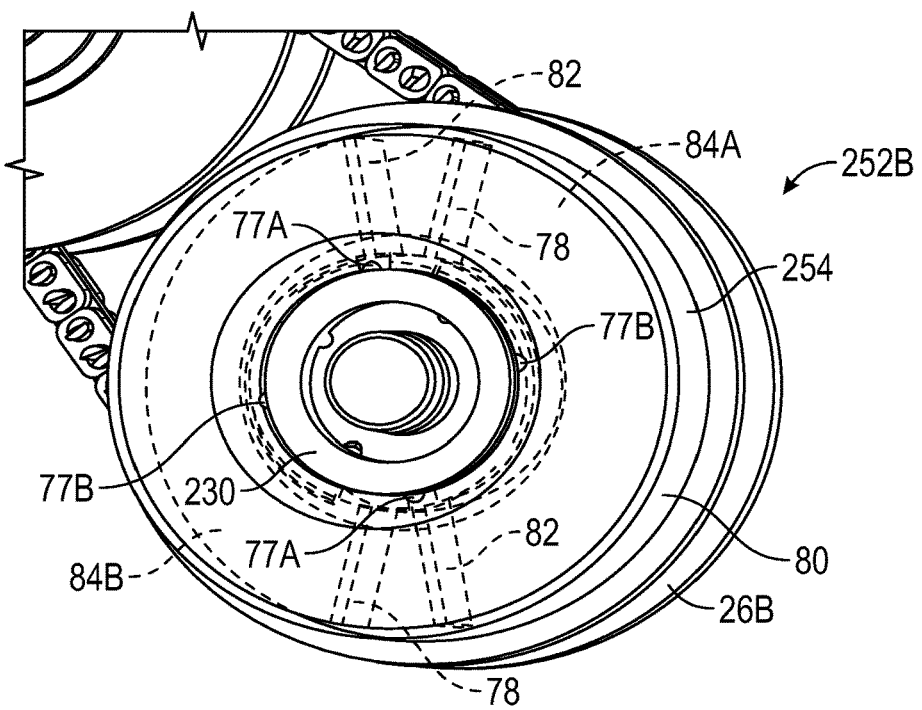
FIG. 6 is a schematic perspective illustration in fragmentary view of a two-chamber rotary piston of the CVT of FIG. 5.

FIG. 6 shows the two-chamber rotary piston 254 as described, but included in a dual-wedge output actuation mechanism 252B that includes what may be referred to as a roller-type dual wedge mechanism. The two-chamber rotary piston 254 of FIG. 6 could instead be used in the output actuation mechanism 152B and with the wedge component 130 of FIG. 5. The dual-wedge embodiment of FIGS. 6 and 7 utilizes a wedge component 230 that has two helical grooves 259A, 259B at an inner cylindrical surface of a wedge component 230. The side surface 256A, 256B of each groove 259A, 259B nearest to the endless rotatable device 28 serves as a wedge surface 256A, 256B such that there are two wedge surfaces.

Figure 7:
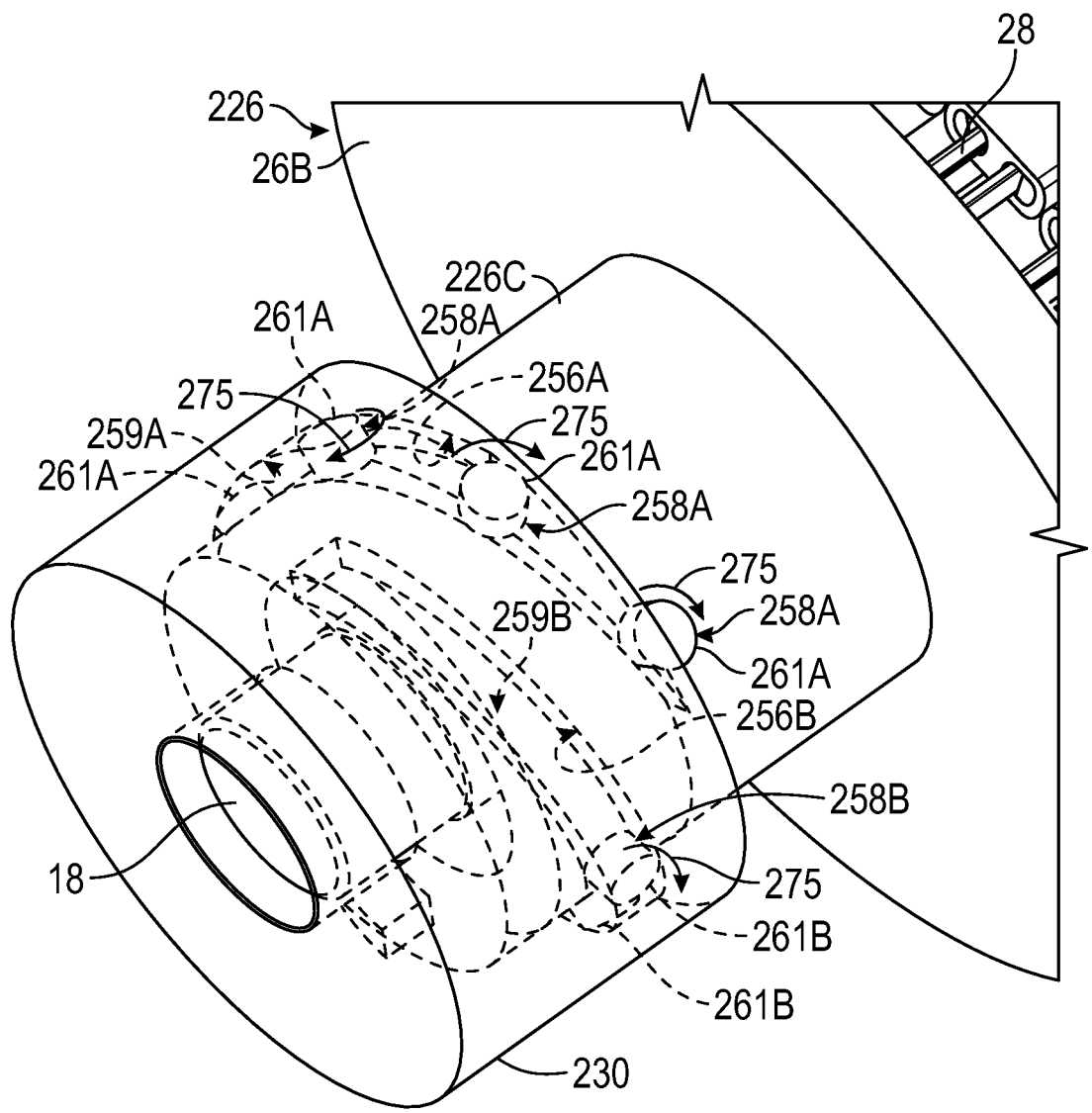
FIG. 7 is a schematic perspective illustration in fragmentary view of a third embodiment of a CVT with a dual wedge actuator in accordance with an alternative aspect of the present teachings.

FIG. 7 shows the output pulley 226 includes the axially-movable sheave 26B but with a pulley shaft 226C that extends along the axis 20 within the wedge component 230. The two-chamber rotary piston 254 is removed in FIG. 7 so that the wedge component 230 is exposed. A first helical array of rolling elements 261A and a second helical array of rolling elements 261B are secured to the pulley shaft 226C. The rolling elements 261A and 261B are spaced about the outer surface of the pulley shaft 226C such that they incline in the same axial direction as the wedge surfaces 256A, 256B. The rolling elements 261A, 261B are spaced so that rolling elements 261A are captured in the first groove 259A, and additional rolling elements 261B are captured in the second groove 259B. Only some of the rolling elements 261A, 261B are visible in FIG. 7. The rolling elements 261A, 261B are fixed in position on the pulley shaft 226C, but each spins along its center axis (as indicated by arrows 275 in FIG. 7) when the rolling elements 261A, 261B contact the wedge surfaces 256A, 256B as the axially-movable sheave 26B rotates relative to the output shaft 18 under the rotary force of the rotary piston 254. The rotary piston 254 surrounds the wedge component 230 and the pulley shaft 226C in the cylindrical space between the wedge component 230 and the cover 80 as shown in FIG. 6. The side surfaces 258A of the rolling elements 261A that contact the first wedge surface 256A in the first wedge groove 259A serve as the first ramp surface 258A. The side surfaces 258B of the rolling elements 261B that contact the second wedge surface 256B in the second wedge groove 259B serve as the second ramp surface 258B.

Figure 8:
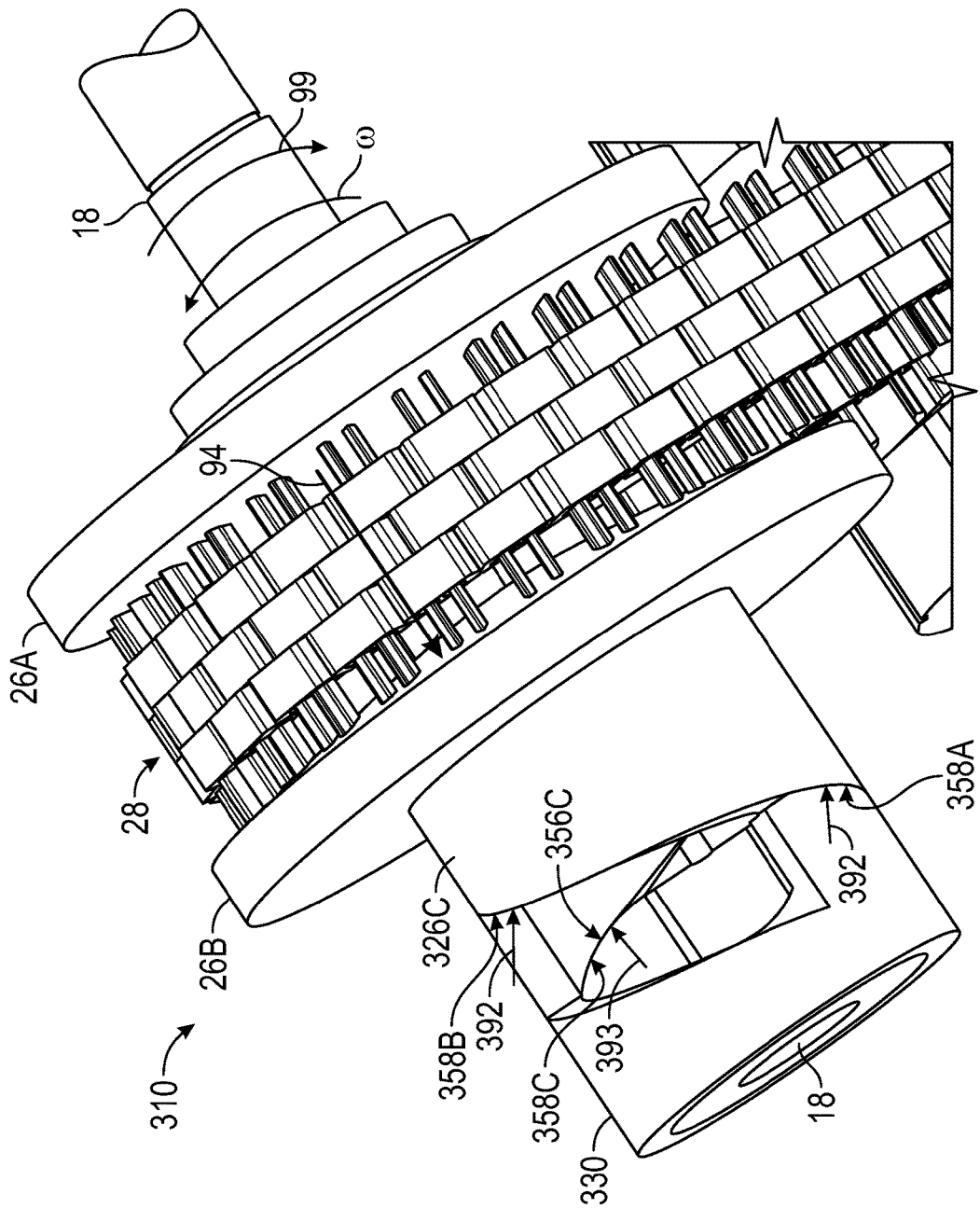
FIG. 8 is a schematic perspective illustration in fragmentary view of a fourth embodiment of a CVT in accordance with an alternative aspect of the present teachings.
Figure 9:
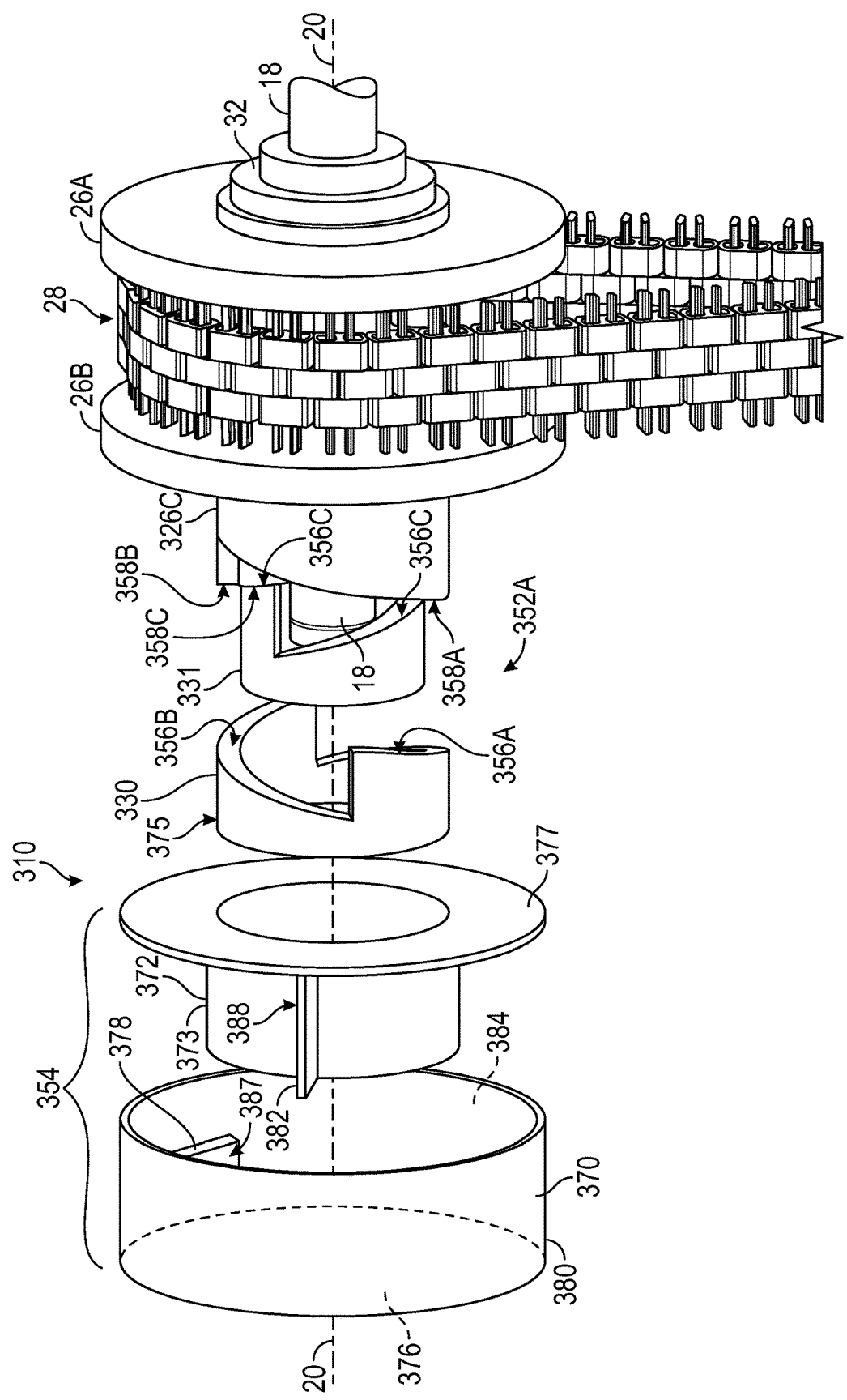
FIG. 9 is a schematic illustration in exploded perspective view of the CVT of FIG. 8.

FIGS. 8 and 9 show another embodiment of a CVT 310 having many of the same components as described with respect to the CVT 10 of FIG. 1. In this embodiment, an actuator mechanism 352A has a wedge component 330 that surrounds the output shaft 18 and is rotatable relative to the output shaft 18 in response to controlled fluid pressure in a rotary piston 354. The rotary piston 354 is controlled by the controller C in the same manner as described with respect to FIG. 1. In contrast to the other embodiments described herein, the wedge component 330 to which the stationary component 370 of the rotary piston 354 is mounted is not fixed to the shaft 18 and can rotate relative to the shaft 18. More specifically, the rotary component 372 of the rotary piston 354 is fixed to the wedge component 330 so that the wedge component 330 rotates with the rotary component 372 when fluid pressure in a fluid chamber 384 of the rotary piston 354 is controlled by the controller C to cause relative rotation of the rotary component 372 and thus phasing of the wedge component 330 relative to the pulley shaft 326C.

Similar to the actuator mechanism 152B, the wedge component 330 has two helical wedge surfaces 356A, 356B that interface with two helical ramp surfaces 358A and 358B of the pulley shaft 326C, respectively. The rotary component 372 of the rotary piston 354 has a cylindrical shaft portion 373 that surrounds and is fixed to an outer surface 375 of the rotary component 372. A radial flange 377 extends from the shaft portion 373, and a vane 382 extends radially outward from the shaft portion 373. The stationary component 370 of the rotary piston 354 is fixed to the shaft 18. More specifically, a radial flange 376 of the stationary component 370 has a central opening at which it is fixedly mounted to an additional wedge component 331. The additional wedge component 331 is in turn fixed to the output shaft 18 such that the stationary component 370 and the additional wedge component 331 rotate with but not relative to the output shaft 18.

The stationary component 370 has a stationary vane 378 that is fixed to the cover 380 of the stationary component 370 and extends radially inward. The fluid chamber 384 is defined between the rotary component 372 and the stationary component 370 from the surface 387 of the stationary vane 378 to the surface 388 of the movable vane 382. The fluid chamber 384 extends from the inner surface of the cover 380 to the outer surface of the shaft portion 373 and from the radial flange 376 to the radial flange 377. When assembled, the rotary piston 354 fits in a cylindrical space around the additional wedge component 331 adjacent the pulley sheave 26B. Fluid pressure in the rotary piston 354 generates wedge forces 392 at the ramp surfaces 358A, 358B as described with respect to the dual wedge surfaces 156A, 156B and wedge surface 56, resulting in a controllable clamping force 94 of the endless rotatable device 28 on the output pulley 26. The input pulley 24 has an identical actuation mechanism operatively connected to the movable sheave 24B of the input pulley 24.

The CVT 310 of FIGS. 8 and 9 includes an additional wedge component 331 that is fixed to the output shaft 18 shaft. The additional wedge component 331 also has dual wedge surfaces. Only one wedge surface 356C is visible in FIG. 9. The dual wedge surfaces of the additional wedge component 331 form another dual helix, each wedge surface spiraling one half turn (180 degrees) around the perimeter of the additional wedge component 331 similar to the wedge surfaces 156A and 156B of the embodiment of FIGS. 5-6. The additional wedge component 331 is surrounded radially-outward by the actuation wedge component 330. The pulley shaft 326C has a second ramp surface 358C and another second ramp surface not visible in FIG. 9 that together form a dual helix. The second ramp surfaces of the pulley shaft 326C are radially-inward of the ramp surfaces 358A, 358B. The second ramp surfaces interface with wedge surfaces 356C (and the other wedge surface not shown) of the additional wedge component 331. The second ramp surfaces of the pulley shaft 326C incline in an opposite direction along the axis 20 than the ramp surfaces 358A, 358B that interface with the wedge surfaces 356A, 356B of the actuation wedge component 330. For this reason, the actuation mechanism 352A is referred to as a cross-wedge.

The actuation wedge component 330 can rotate relative to the additional wedge component 331. A bearing may be placed between the inner surface of the actuation wedge component 330 and the additional wedge component 331 to aid in this relative rotation. A torque load 99 on the output shaft 18 is in an opposite direction as the direction of rotation of the output pulley 26 under the force of the endless rotatable device 28. Accordingly, a wedge force due to this torque is indicated as wedge force 393 in FIG. 8. This wedge force 393 has a component acting in the same axial direction as the wedge forces 392 of the actuation wedge component 330 and thus results in an additional clamping force of the endless rotatable device 28 against the movable sheave. The wedge force 393 is generated due to the torque load 99 automatically (i.e., not under the control of the controller C) and the additional wedge 331 is referred to as a self-reinforcement wedge.

In each embodiment disclosed herein, a clamping force on the movable sheave 26B is controlled and pumping losses are minimized by utilizing the mechanical advantage of wedge components 30, 130, 230, 330.

FIGS. 10-15 illustrate various embodiments of powertrains having a CVT 10 as described herein, but utilizing any of various disclosed linear actuators rather than rotary actuation via a rotary piston. Additionally, each of the embodiments of FIGS. 10-15 utilizes wedge components configured to automatically provide an axial component of a wedge force $F_{wedge}$ against the ramp surface of the respective movable pulley given the direction of input drive torque and the direction of reaction torque due to the load on the output shaft. The linear actuator provides a controllable axial force. The thrust bearing 32 reacts the axial forces, and a resulting clamping force $F_{clamp}$ is as follows:

$$F_{clamp} = F_{wedge\ axial} + F_{linear\ actuator} \quad \text{(EQUATION 2)}$$

Because the automatic wedge force may be relied on for a significant portion of the clamping force, an electric or hydraulic pump that may be included in a given actuator mechanism described herein may be "downsized" relative to typical powertrain pumps. For example, the axial component of the wedge force may provide 90 percent of the desired clamping force in the embodiments described herein, or may provide a different percentage of the required wedge force dependent on the angle of incline of the wedge surface to the axis of rotation.

Figure 10:
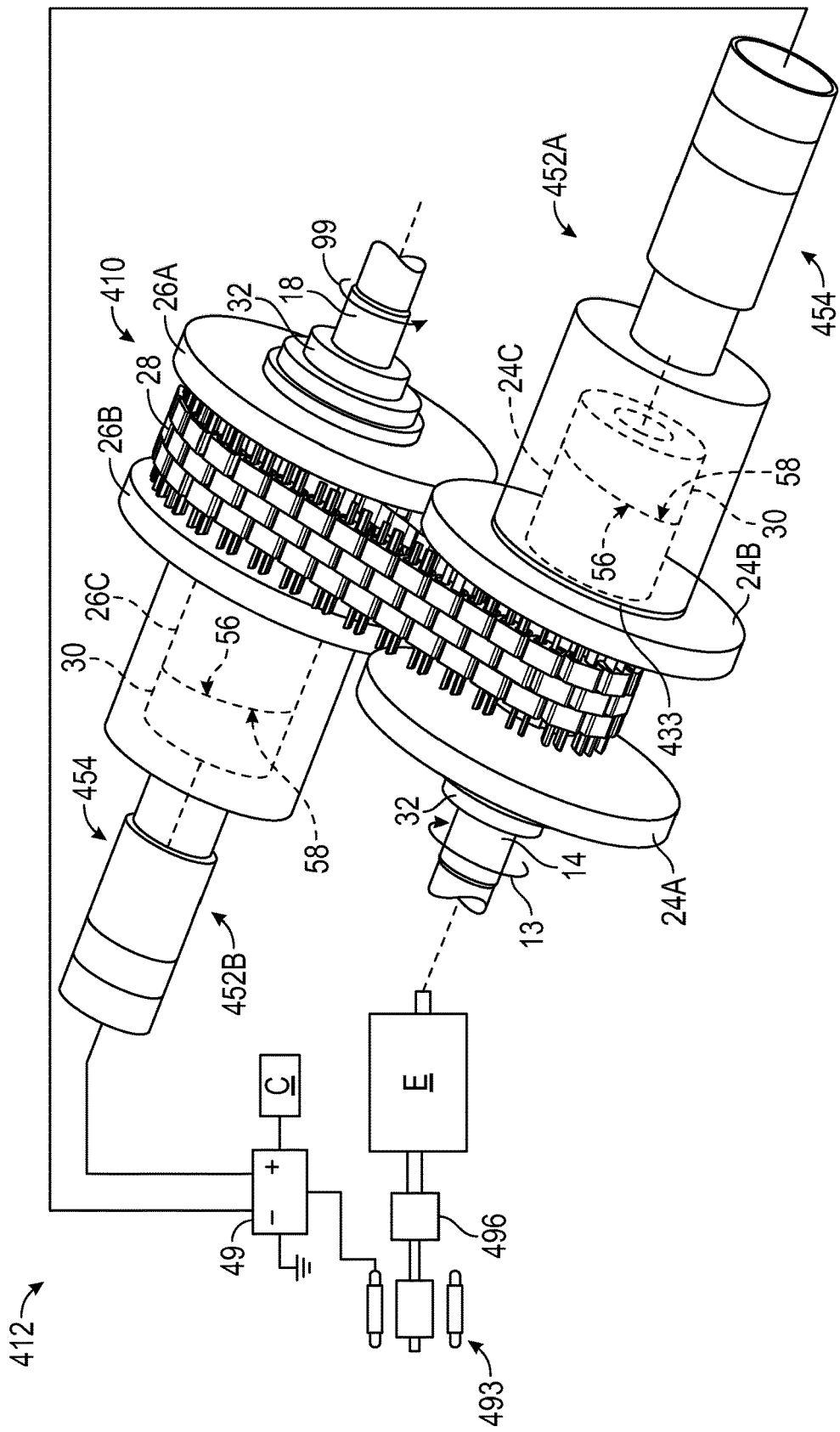
FIG. 10 is a schematic perspective illustration in fragmentary view of a hybrid powertrain with a fifth embodiment of a CVT in accordance with an alternative aspect of the present teachings.

More specifically, FIG. 10 shows a powertrain 412 with an alternative embodiment of a CVT 410 alike in all aspects to CVT 10 except that actuator mechanisms 52A, 52B having rotary pistons 54 are replaced with input actuator mechanism 452A and output actuator mechanism 452B having linear actuators 454 as described herein. Moreover, the input actuator mechanism 452A and the output actuator mechanism 452B are independently (i.e., separately) controllable by electronic controller C to enable activation of only one or of both actuators input and output linear actuators 454 simultaneously to provide an axial force $F_{linear\ actuator}$ 490 to affect the overall clamping force $F_{clamp}$ 494 of the input pulley or the output pulley, respectively. Additionally, the wedge surface 56 and the ramp surface 58 need not wind a full turn around the perimeter of the input pulley shaft 24C or output pulley shaft 26C as only 90-120 degrees of rotation is required for a full range of axial motion to adjust the position of the axially movable sheaves 24B, 26B.

The CVT 410 includes the variator assembly 22 that includes a pulley supported on the shaft. The input wedge component 30 has a wedge surface 56 that automatically engages the ramp surface 58 of movable sheave 24B when torque 13 on the input shaft is in the first direction shown in FIG. 10. The first direction may be the direction of drive torque of an engine E included in the hybrid powertrain. Although shown only with a broken line connection, a crankshaft of the engine E is operatively connectable to drive the input shaft 14 as understood by those skilled in the art. Similarly, the wedge surface 56 of the output wedge component 30 automatically engages the ramp surface 58 of the output pulley 26 when torque load 99 is on the output shaft 18, with the wedge surface 56 applying an axial wedge force on the ramp surface 58. The axial wedge force $F_{wedge\ axial}$ 492 of the wedge component 30 and the axial force 490 of the linear actuator 454 of the actuator mechanism 452A or 452B together contribute to the clamping force $F_{clamp}$ 494 of the endless rotatable device 28 on the moveable sheave 24B or 26B, respectively. Accordingly, under operating conditions when the axial wedge force $F_{wedge\ axial}$ 492 needs to be supplemented in order to achieve a desired clamping force $F_{clamp}$ or in order to change a ratio of the CVT 410, the linear actuator 454 can be controlled to provide a desired axial force 490.

Because at each pulley 24, 26 only the axial component $F_{wedge\ axial}$ 492 of the wedge force 92 contributes to the clamping force $F_{clamp}$ 494, the ratio of the wedge force 92 to the clamping force $F_{clamp}$ 494 is dependent on the angle α of the wedge surface 56 relative to a line 93 that is perpendicular to the axis of rotation of the input shaft 14 (i.e., input axis 16) or to the axis of rotation of the output shaft 18 (i.e., output axis 20), respectively.

Figure 11:
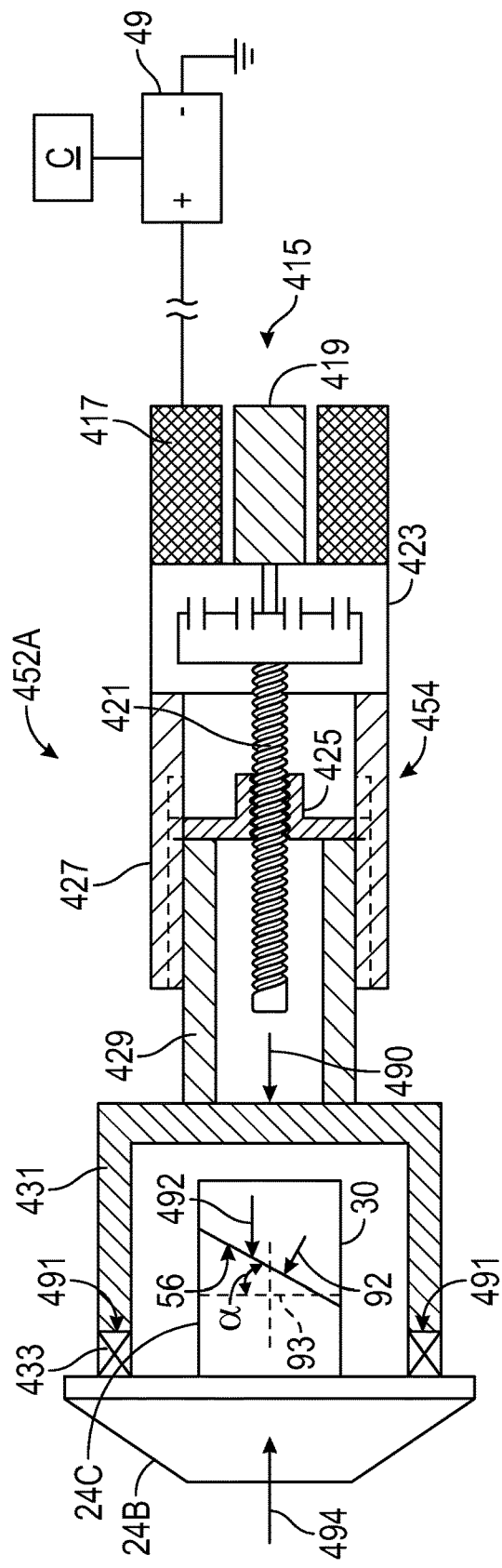
FIG. 11 is a schematic cross-sectional illustration of an electric linear actuator included in the CVT of FIG. 10.

The output linear actuator 454 is identical to and functions as described with respect to input linear actuator 454 shown in FIG. 11 except that it provides an axial force $F_{linear\ actuator}$ 490 on the movable sheave 26B of the output pulley 26B. Both are activated by electrical power provided from a battery 49. The electronic controller C is operable to independently control the input linear actuator and the output linear actuator.

The axial force $F_{linear\ actuator}$ 490 applied by the linear actuator 454 may be at least partially in response to the torque provided by the engine E. Stated differently, the controller C may monitor the input torque 13 and activate the linear actuator 454 to provide an axial force $F_{linear\ actuator}$ 490 that varies in response to variation of the input torque 13. For example, an electric machine 493 may be operatively connected to the engine E such as via a planetary gear set 496, which may be a simple planetary gear set or a complex planetary gear set and may include one or more controllable, selectively engagable clutches (not shown). During engine braking, the electric machine 493 may be controlled to function as a generator using torque provided by the engine E. The axial force $F_{linear\ actuator}$ 490 provided by the linear actuator 454 is varied in response to the torque provided by the engine E to the electric machine 493.

With reference to FIG. 11, the linear actuator 454 comprises an electric motor 415 having a stator 417 and a rotatable rotor 419. The stator 417 is selectively powered by the battery 49 via the controller C to cause rotation of the rotor 419. The rotor 419 is operatively connected to a lead screw 421, optionally via a gearing mechanism 423 such as a simple planetary gear set that can multiply torque. Rotation of the lead screw 421 causes axial travel of a threaded nut 425. The nut 425 is splined to a tubular housing 427. Both the nut 425 and the housing 427 are non-rotatable. The nut 425 travels axially relative to the housing 427 when the lead screw 421 rotates. A tube 429 is fixed to the nut 425 and slides axially with the nut 425 relative to the housing 427. The tube 429 is fixed to a hollow cylinder 431 that interfaces with a bearing 433 secured to the axial end of the movable sheave 24B. The cylinder 431 moves axially with the nut 425 and the tube 429 without rotating, and adjusts the axial position of the movable sheave 24B. The movable sheave 24B can rotate relative to the cylinder 431 due to the bearing 433. The electric motor 415 is activated by the electronic controller C in response to predetermined powertrain 412 operating conditions to turn the lead screw 421 and thereby apply an axial force 490 is depicted centrally located on the cylinder 431 but is actually applied along the annular surface 491 of the bearing 433 to the sheave 24B. The actuating mechanism 452B has an identical linear actuator 454 that provides axial force to move the movable sheave 26B. The actuator mechanism is electrically powered and is characterized by an absence of hydraulic actuation.

Figure 12:
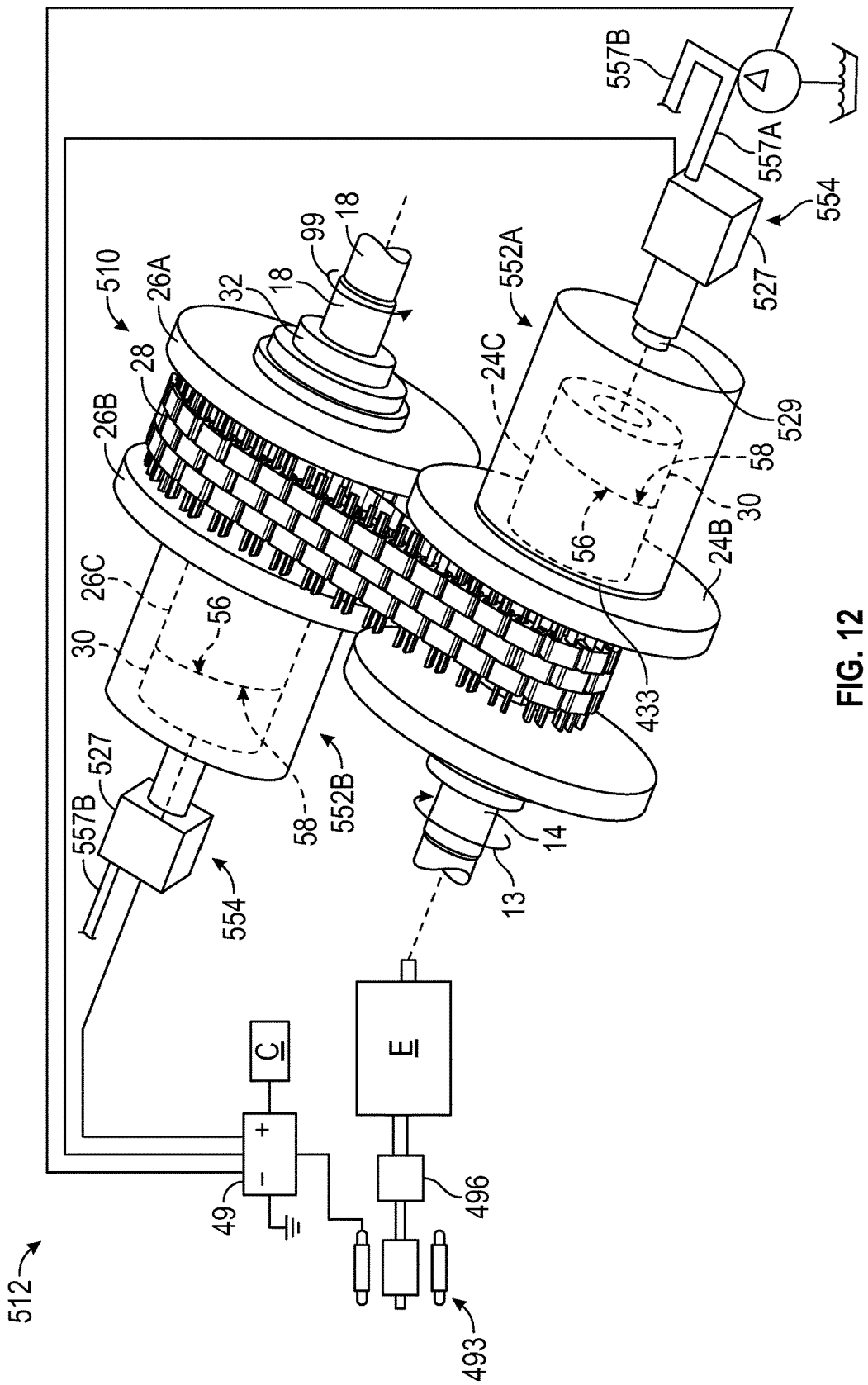
FIG. 12 is a schematic perspective illustration in fragmentary view of a hybrid powertrain with a sixth embodiment of a CVT in accordance with an alternative aspect of the present teachings.
Figure 13:
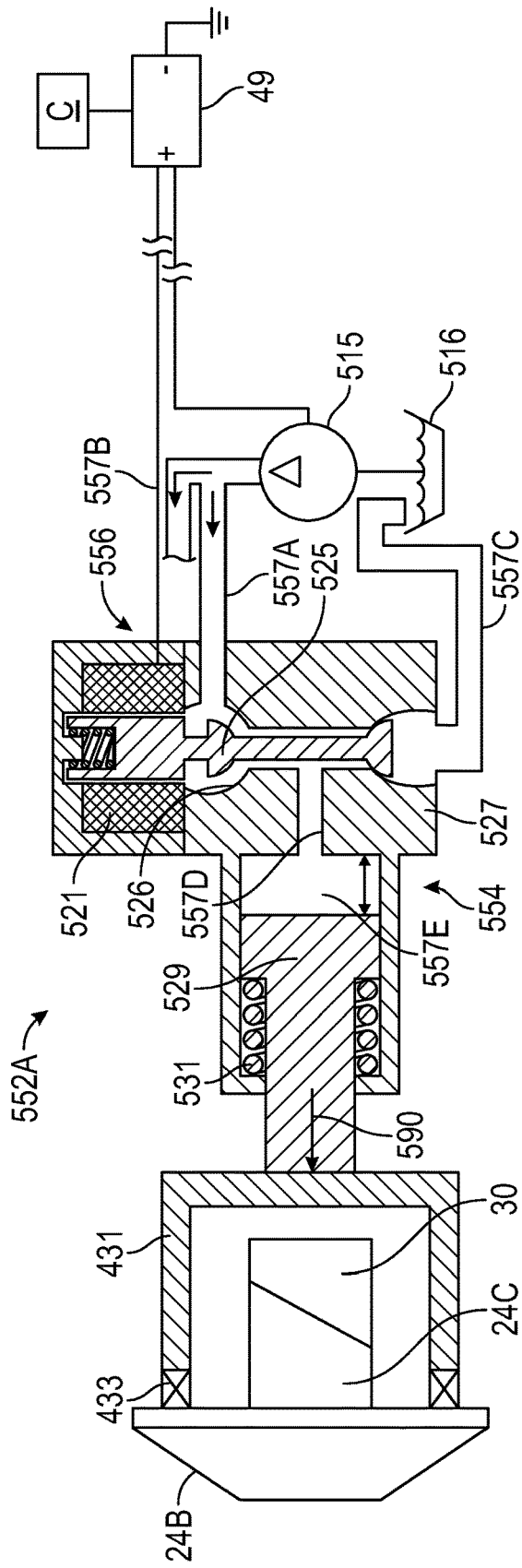
FIG. 13 is a schematic cross-sectional illustration of a hydraulic actuator and an electric pump included in the CVT of FIG. 12.

FIGS. 12-13 show a powertrain 512 with an alternative embodiment of a CVT 510. The powertrain 512 is alike in all aspects to powertrain 412, and the CVT 510 is alike in all aspects to CVT 10 and CVT 410 except that input actuator mechanism 552A and an output actuator mechanism 552B are used, each having a linear actuator 554 as described herein. The input linear actuator mechanism 552A and the output linear actuator mechanism 552B share a common electric pump 515. The electric pump 515 is powered by the battery 49. Each of the input linear actuator mechanism 552A and the output linear actuator mechanism 552B also include a hydraulic system 556. The hydraulic system 556 includes hydraulic supply channels 557A, 557B and a hydraulic linear actuator 554. The hydraulic supply channels 557A, 557B, route fluid from a sump 516 that is pressurized by the pump 515 to the respective input and output actuators 554. A hydraulic exhaust channels 557C at each of the hydraulic linear actuators 554 routes fluid from linear actuator 554 back to the pump 515.

The hydraulic system 556 includes a solenoid valve 521 operatively connected to the electronic controller C via the battery 49 such that the electronic controller C selectively energizes the valve 521 in response to predetermined powertrain 512 operating conditions such that a poppet of a valve member 525 is moved away from a valve seat 526 of a valve housing 527 to permit the pressurized hydraulic fluid to pass from the respective supply channel 557A or 557B to a control passage 557D and a supply chamber 557E where the pressurized fluid acts against a piston 529 to move the piston axially against the force of a return spring 531, applying an axial force 590 on the movable sheave 24B at the bearing 433 via the cylinder 431, similarly as described with respect to axial force 490 of FIG. 11. The controller C can also discontinue electrical power to the valve 521, allowing the valve member 525 to seat, and thereby allowing some or all of the fluid in the chamber 557E to exhaust back to the pump 515. Other arrangements of hydraulic solenoid valves that provide an axial force may be used.

The output actuating mechanism 552B has an identical linear actuator 554 that provides axial force to move the movable sheave 26B. Because each actuator 554 has a controllable valve 521, the linear actuator 554 of the input actuator mechanism 552A and the linear actuator 554 of the output actuator mechanism 552B are independently activated via fluid in the hydraulic system that is pressurized by the electric pump 515. In other words, axial force can be applied to the sheave 24B without applying an axial force to sheave 26B, or by applying a different amount of axial force to sheave 26B, or the same level of axial force can be applied to both sheaves 24B, 26B. Powertrain operating conditions that may trigger the controller C to activate one or both actuators 554 include a hybrid stop-start mode in which the engine E is shut down such as at a stop light or during highway cruising. The pump 515 can be the only pump used for providing hydraulic pressure to the powertrain 512. In other words, the same pump 515 can be used during engine only operating modes, and during hybrid operating modes. The pump 515 may be of a relatively small capacity given the axial component of the automatic wedge force providing much of the needed clamping force. For example, the electric pump 515 may have a capacity of less than or equal to 10 bar.

Figure 14:
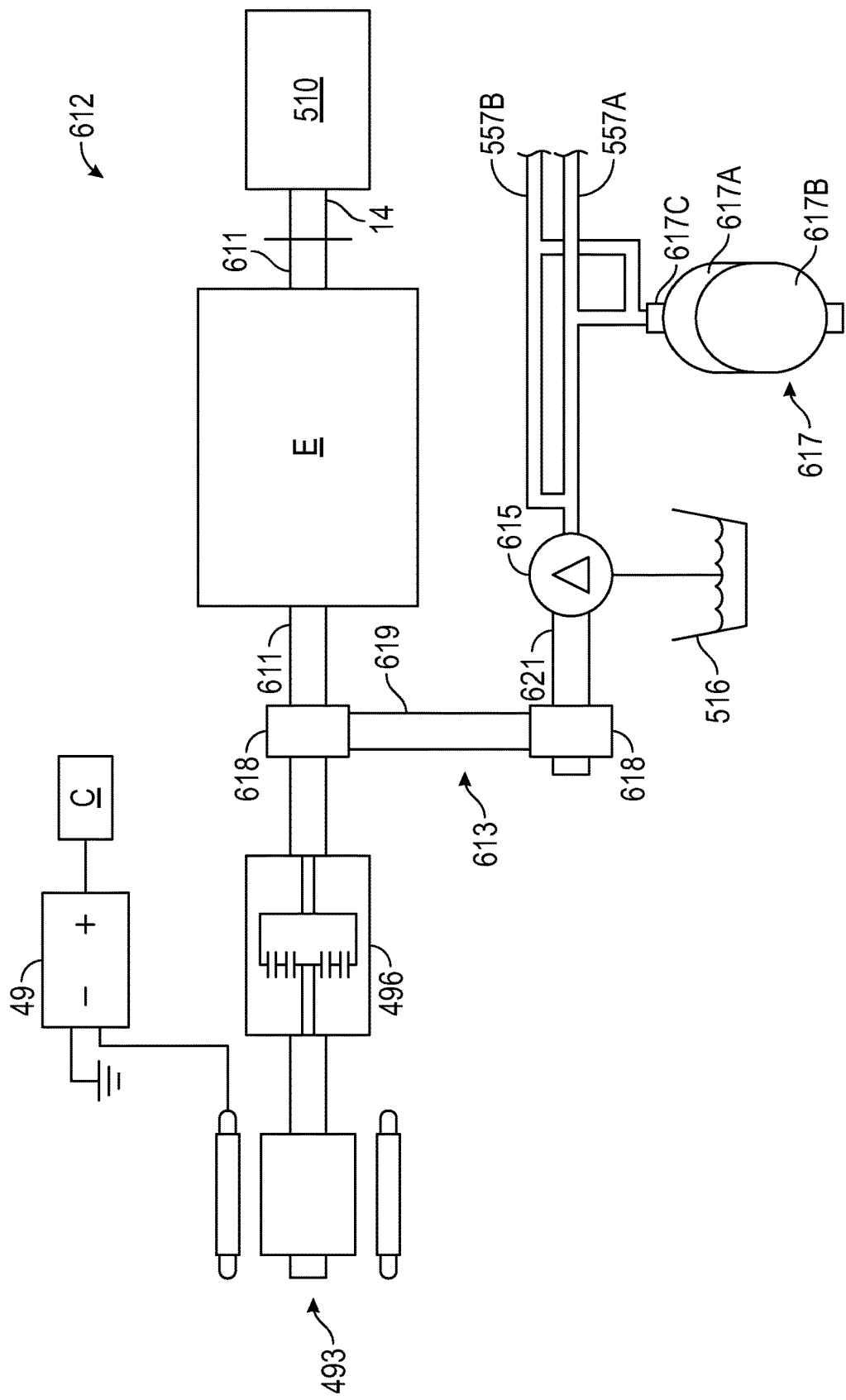
FIG. 14 is a schematic perspective illustration in fragmentary view of a hybrid powertrain with a mechanical pump and a hydraulic accumulator for use with the CVT and hydraulic actuator of FIG. 13.

FIG. 14 shows another embodiment of a powertrain 612 that can be used in place of powertrain 512 with the CVT 510 of FIG. 12. The CVT 510 is represented more schematically in FIG. 14, showing only the input shaft 14 secured for rotation with a crankshaft 611 of the engine E. The powertrain 612 has the same components as powertrain 512, except that an engine driven hydraulic pump 615 and a hydraulic accumulator 617 are used in place of electric pump 515. The input actuator mechanism 552A and an output actuator mechanism 552B are used, each having a linear actuator 554 as described herein.

The pump 615 is mounted on an accessory shaft 621 that is rotatably driven via the engine E by a belt drive 613 that transfers torque from the crankshaft 611 via pulleys 618 mounted to the respective shafts 611, 621 and a belt 619 engaged with the pulleys. The pump 615 may be, for example, a balanced vane pump.

A hydraulic accumulator 617 is downstream of the outlet of the pump 615 and receives fluid pressurized by the pump 615. The hydraulic accumulator maintains a reserve of the pressurized fluid in a fluid chamber 617A. A gas chamber 617B contains gas that is further pressurized when the volume of the gas chamber 617B is decreased by the fluid entering the fluid chamber 617A. A valve assembly 617C allows the pressurized fluid to enter, but not to exit the accumulator 617 until the fluid pressure in the hydraulic supply channels 557A, 557B drops below a predetermined pressure, at which pressure the accumulator 617 supplements the line pressure.

Accordingly, under powertrain operating conditions in which the engine E is running (providing torque to the crankshaft 611), the engine driven pump 615 is operable to supply fluid pressure to activate the linear actuators 554 when the controller C energizes the solenoid valves 521. Additionally, because the axial wedge force provides a significant portion of the required clamping force, the pump 615 can be of a relatively small capacity given the axial component of the automatic wedge force providing much of the needed clamping force. For example, the engine-driven hydraulic pump 615 may have a capacity of less than or equal to 20 bar. When the engine E is not running, such as during a hybrid stop-start mode, the accumulator 617 provides a sufficient reserve of hydraulic pressure to enable the hydraulic linear actuators 554 at the sheaves 24B, 26B to function under the control of controller C.

Figure 15:
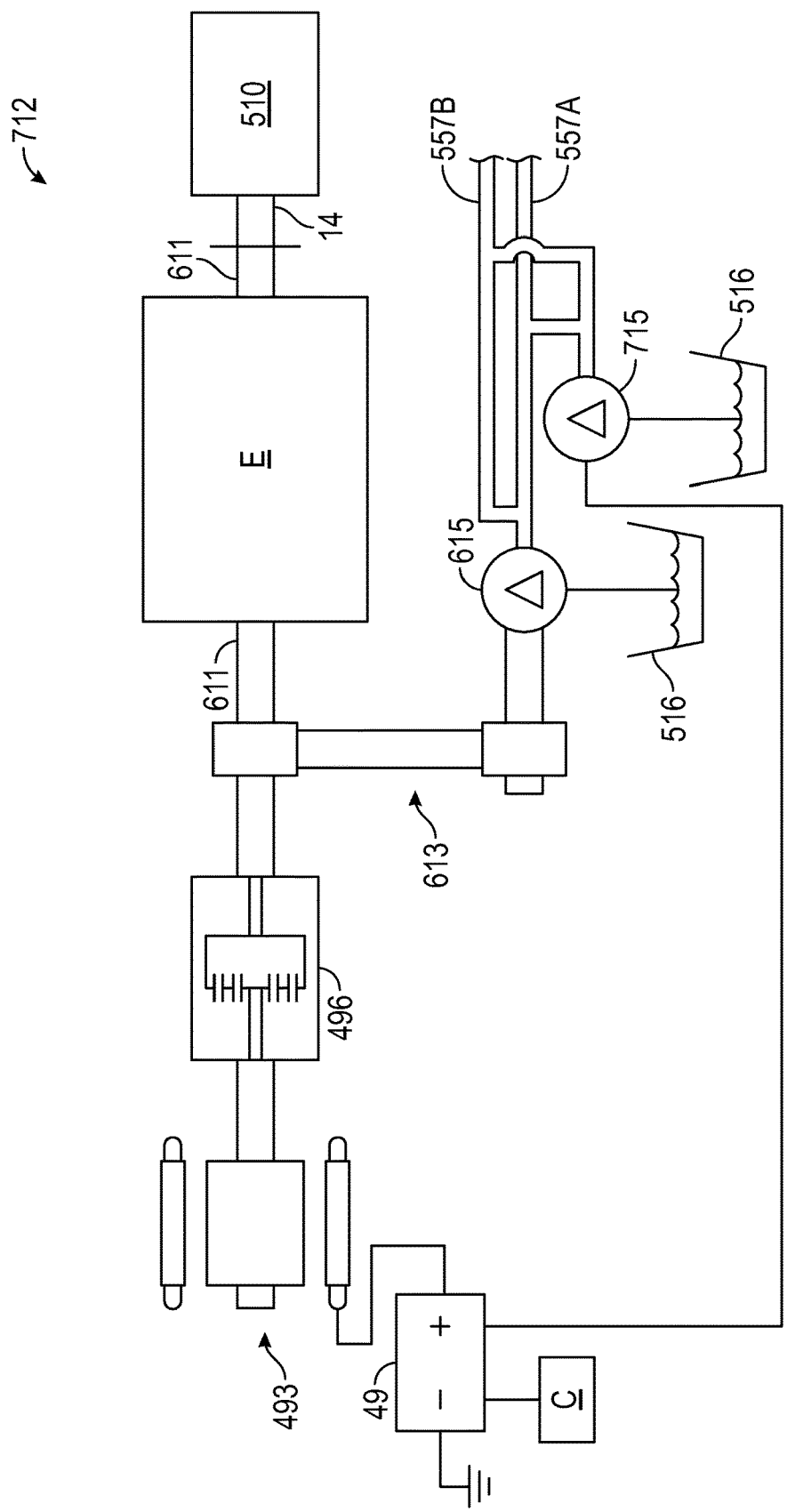
FIG. 15 is a schematic perspective illustration in fragmentary view of a hybrid powertrain with a mechanical pump and an electric pump for use with the CVT and hydraulic actuator of FIG. 13.

FIG. 15 shows another embodiment of a powertrain 712 that can be used in place of powertrain 512 with the CVT 510 of FIG. 12. The CVT 510 is represented more schematically in FIG. 14, showing only the input shaft 14 secured for rotation with a crankshaft 611 of the engine E. The powertrain 712 has the same components as powertrain 612, except that an electric pump 715 is used in place of the hydraulic accumulator 617. The input actuator mechanism 552A and an output actuator mechanism 552B are used, each having a linear actuator 554 as described herein. Accordingly, the hydraulic linear actuators 554 at sheaves 24B and 26B can be actuated using hydraulic pressure supplied by either or both of the engine driven mechanical pump 615 or the electric pump 715.

Accordingly, under powertrain operating conditions in which the engine E is running (providing torque to the crankshaft 611), the engine driven pump 615 is operable to supply fluid pressure to activate the linear actuators 554 when the controller C energizes the solenoid valves 521. Additionally, because the axial wedge force provides a significant portion of the required clamping force, the pump 615 can be of a relatively small capacity given the axial component of the automatic wedge force providing much of the needed clamping force. For example, the engine-driven hydraulic pump 615 may have a capacity of less than or equal to 20 bar. When the engine E is not running, such as during a hybrid stop-start mode, the electric pump 715 can provide hydraulic pressure to enable the hydraulic linear actuators 554 at the sheaves 24B, 26B to function under the control of controller C. During high demand maneuvers, such as vehicle wide open throttle launch and tip in acceleration, the capability of both pumps 615, 715 may be needed to quickly generate sufficient hydraulic pressure to provide a desired linear axial force on one or both movable sheaves 24B, 26B.

Figure 16:
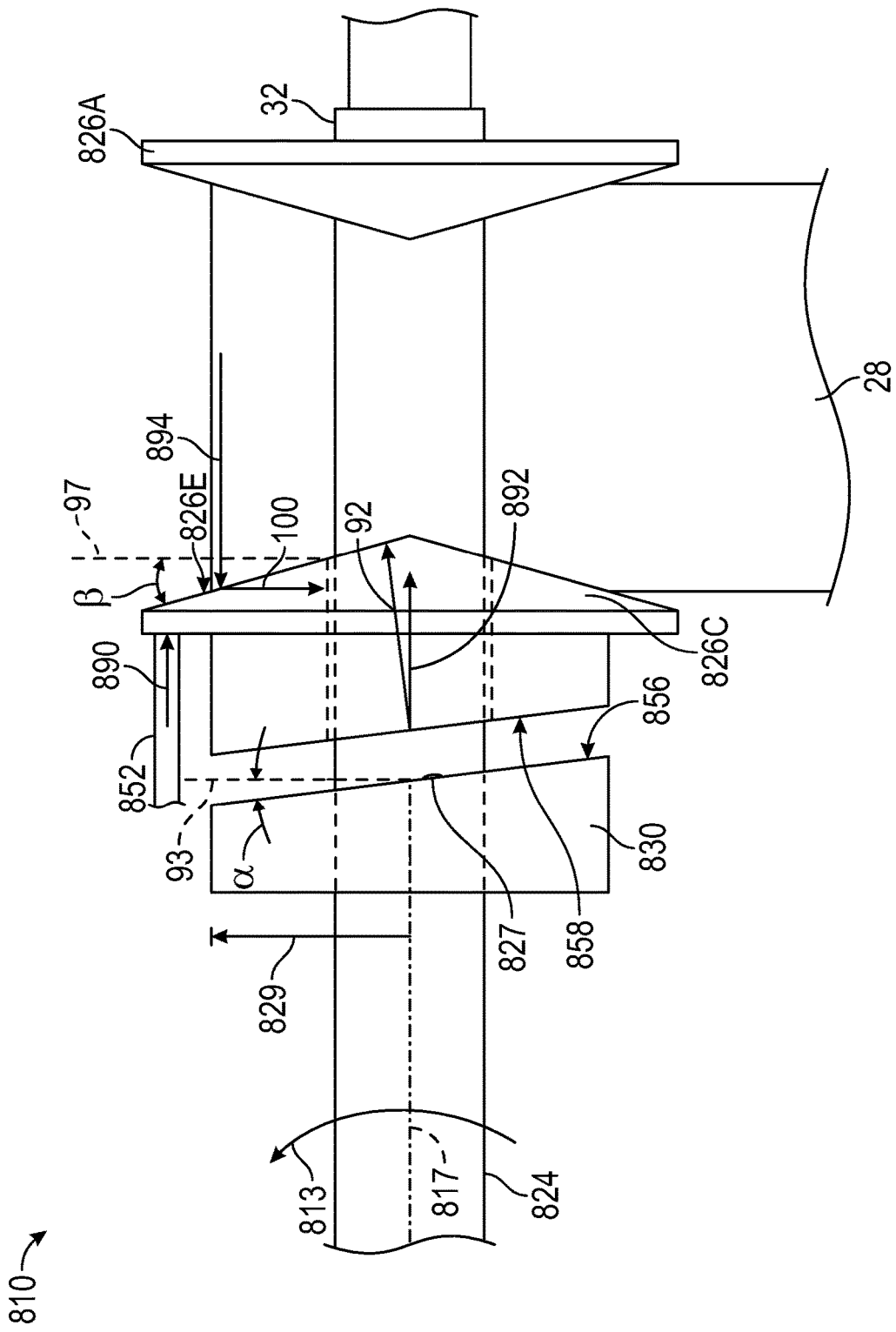
FIG. 16 is a schematic illustration of a portion of a CVT with a wedge component and a linear actuator and showing forces acting thereon.

FIG. 16 is a schematic illustration of a portion of a CVT 810 that is representative of any of the input shaft or output shaft on any of the CVTs described herein that include an input linear actuator and an output linear actuator, such as CVTs 410, 510. The CVT 810 includes an input shaft and an output shaft, each having a fixed pulley and an axially movable pulley, and each having a linear actuator 852 to move the movable pulley, as described with respect to any of FIGS. 10-15. The linear actuator 852 is representative of any of the linear actuators shown and described herein, or any other suitable linear actuator. The linear actuator 852 is shown only schematically as operable to apply an axial piston force 890 on the axially movable sheave 826C. In FIG. 16, the shaft 824 is representative of either an input shaft or an output shaft, and has a wedge component 830 operable as described with respect to any of the wedge components herein. The axially movable sheave 826C is controllably axially movable via the linear actuator 852 under the control of the electronic controller C toward the fixed sheave 826A.

The wedge component 830 has a wedge surface 856 that interfaces with a ramp surface 858 of the axially movable sheave 826C to provide a wedge force 92 when a direction of torque 813 on the shaft 824 is in a forward drive direction if the shaft 824 is the input shaft, or when the load (reaction) torque is opposite to the direction of torque 13 if the shaft 824 is the output shaft. A force sensor 827 is mounted on the wedge surface 856 and is operatively connected (via conductive wires, wirelessly, or otherwise) to the electronic controller C. The force sensor 827 provides a sensor signal to the electronic controller C, with the sensor signal being indicative of the wedge force 92, so that the electronic controller C determines the wedge force 92 based on the sensor signal. The CVT 810 includes both such an input wedge component mounted on an input shaft and an output wedge component mounted on the output shaft. Stated differently, the input wedge component and the output wedge component are configured so that they automatically provide the input wedge force and the output wedge force due to the direction of the drive torque 13 and the direction of the torque load 99 described herein. For example, the angle of the wedge surface 856 of the input wedge component and of the output wedge component is such that the wedge forces have an axial component that is inward toward the respective movable sheave 826C, thereby increasing the input and output clamping forces. The output pulley is connected with the input pulley via an endless rotatable device 28 such that the output shaft is driven via the input shaft.

The CVT 810 includes a linear actuator 852 operable to provide an axial force on the input movable sheave, and an output actuator (also represented schematically as actuator 852) operable to provide an axial force on the output movable sheave, and may be an electric linear actuator 454 as described with respect to FIGS. 10 and 11, or a hydraulic linear actuator 554 having any of the hydraulic systems described herein, as shown in FIGS. 12-15. The input actuator or output actuator is schematically represented by the schematic portion of an actuator 852 providing controllable axial force 890.

Figure 17:
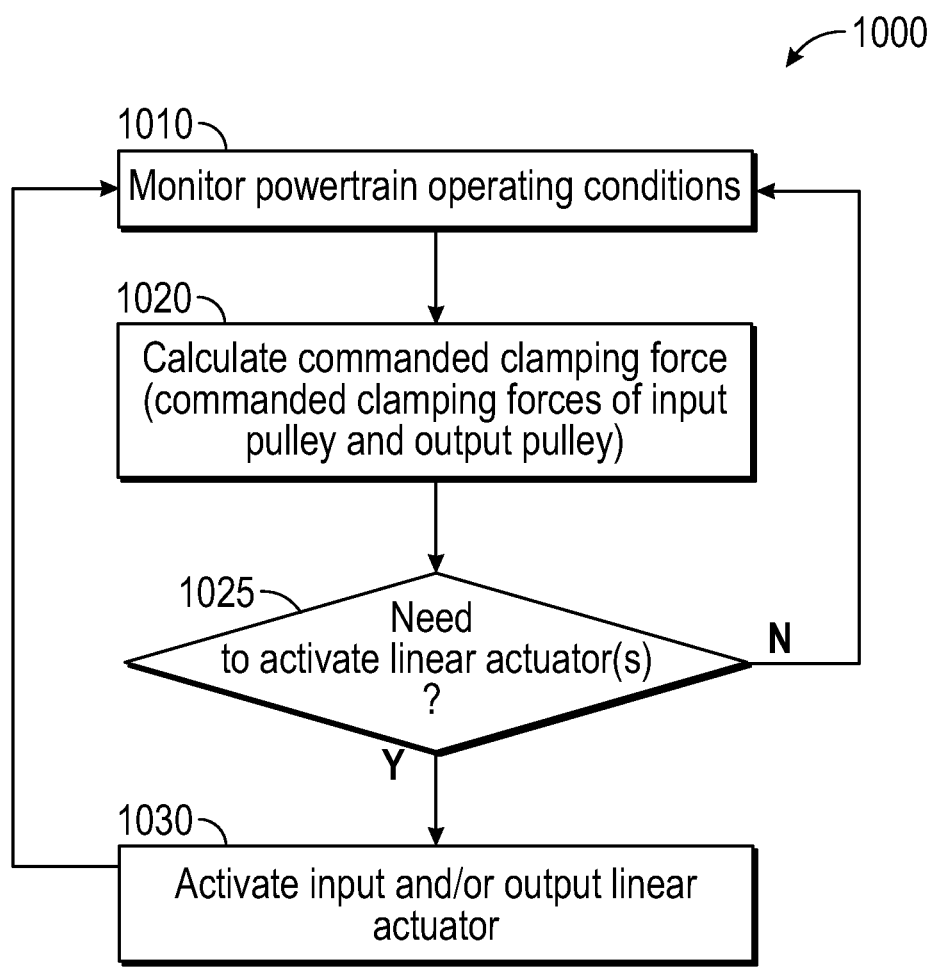
FIG. 17 is a flow diagram of a method of controlling a CVT.

Referring to FIG. 16, the clamping force $F_{clamp}$ 894 is the sum of the axial component $F_{wedge\ axial}$ 892 of the wedge force 92 and the force $F_{linear\ actuator}$ 890 of the linear actuator 852, according to Equation 2. A commanded clamping force will vary depending upon powertrain operating conditions. Accordingly, FIG. 17 shows a method 1000 of controlling a CVT. Under the method, the controller C calculates a commanded clamping force to be commanded via an electronic control signal, including a commanded clamping force of the input linear actuator, and a commanded clamping force of the output linear actuator (and more specifically, the axial forces of the linear actuators) in light of the powertrain operating conditions. The controller C then activates the input linear actuator and/or the output linear actuator as necessary so that the commanded clamping force at the input pulley and the commanded clamping force at the output pulley is achieved. In some embodiments, the axial component of the wedge force may also be controlled.

Figure 19:
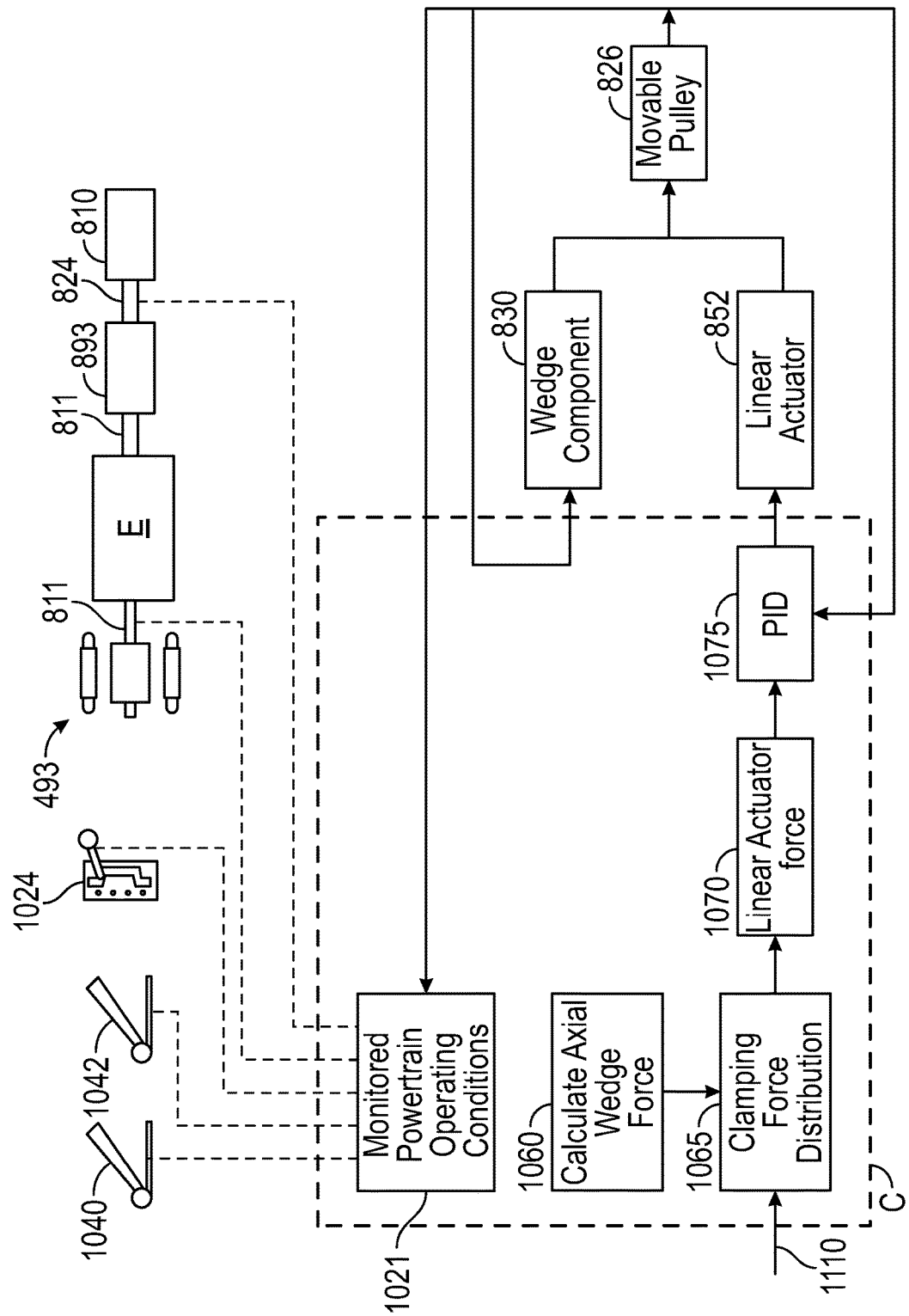
FIG. 19 is a schematic representation of an embodiment of a powertrain controlled according to the method of FIG. 17.
Figure 20:
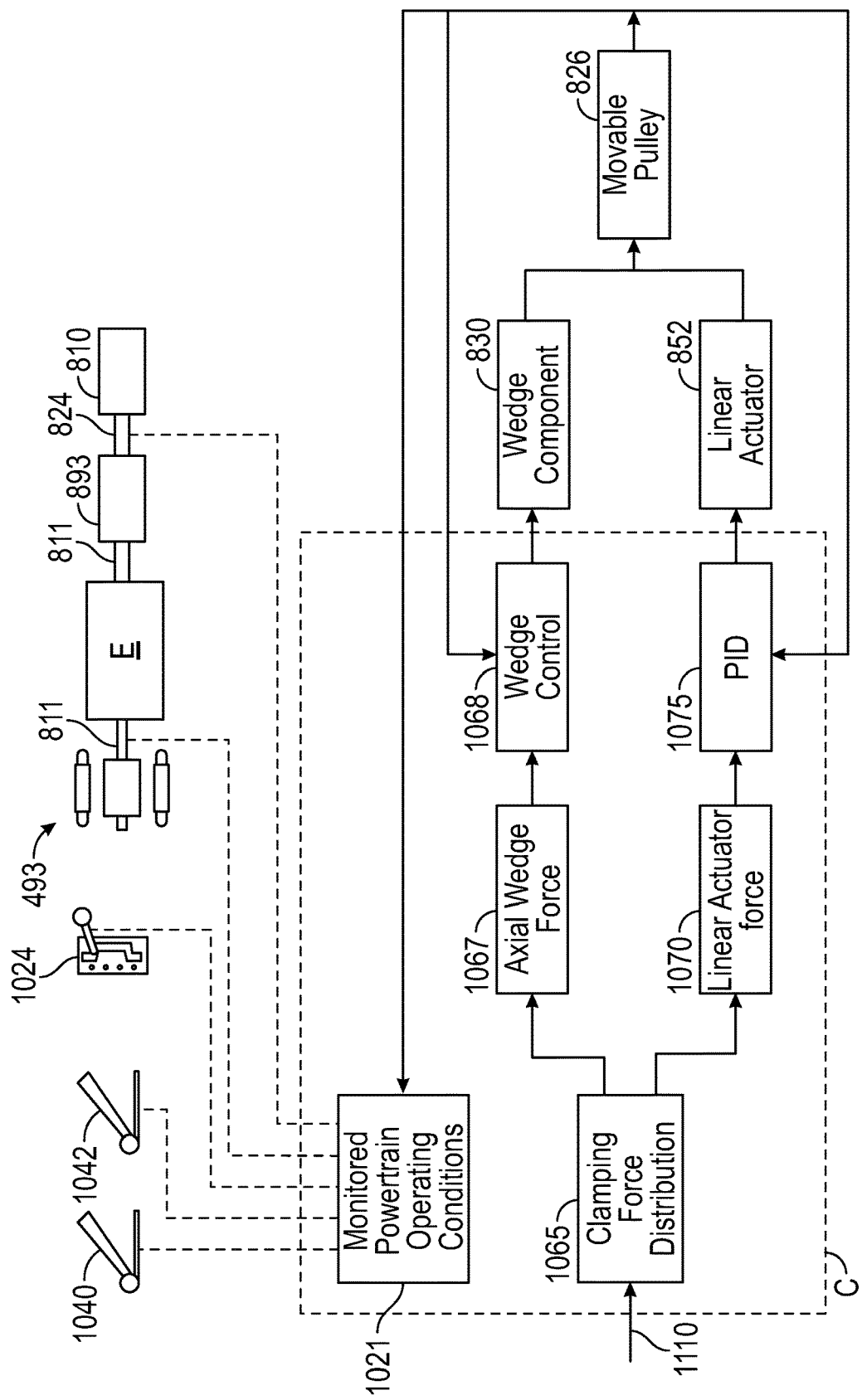
FIG. 20 is another schematic representation of an embodiment of a powertrain controlled according to the method of FIG. 17.

Referring to FIG. 17, under the method 1000 carried out by the electronic controller C, in step 1010, the controller C monitors powertrain operating conditions 1021, some of which are indicated in FIGS. 19 and 20, and which may be indicative of torque on the input shaft of the CVT, and torque on the output shaft of the CVT. Then, in step 1020, the electronic controller C calculates a commanded clamping force 1110 including calculating a commanded clamping force of the input pulley on the endless rotatable device 28, and a commanded clamping force of the output pulley on the endless rotatable device 28. In FIG. 16, the commanded clamping force has the magnitude $F_{clamp}$ 894 and is represented as a control signal having the value of the commanded clamping force 1110 in FIGS. 19 and 20, and may also be referred to herein as the calculated clamping force.

In an aspect of the disclosure, a target speed ratio (or torque ratio) of the CVT (referred to herein as a target ratio) may be determined from the monitored powertrain operating conditions 1021. For example, the controller C may include a stored ratio map, such as a table of ratios corresponding with powertrain operating conditions. The table may be compiled from test data. The commanded clamping force 1110 may be the clamping force needed to achieve that ratio in the ratio map that corresponds with the monitored powertrain operating conditions 1021 (i.e., the target ratio). For example, the target ratio may be that which allows the engine E driving the input shaft of the CVT to operate at its most efficient operating point.

Figure 18:
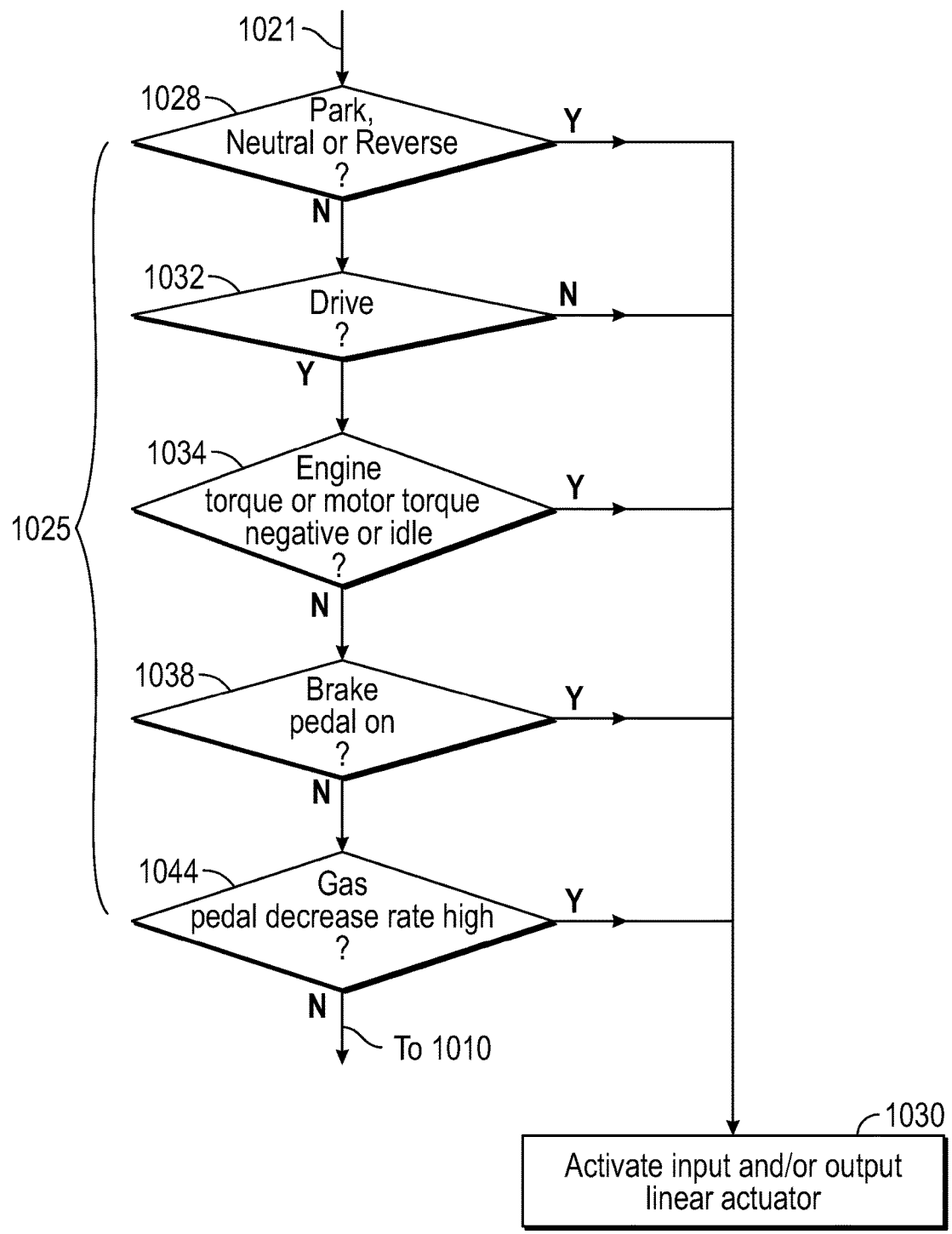
FIG. 18 is a flow diagram of a portion of the method of FIG. 17.

Following step 1020, the controller C then decides in step 1025 whether activation of either or both of the input linear actuator or the output linear actuator will be required in order to achieve the calculated commanded clamping force, and if so, then in step 1030 activates that one or both of the linear actuators according to a clamping force distribution between the respective wedge component 830 and the respective linear actuator 852, i.e., for each of the input pulley and the output pulley, what portion of the respective calculated commanded clamping force is to be provided by the wedge component, and what portion, is to be provided by the controllable linear actuator. The clamping force distribution is discussed with respect to the embodiments of FIGS. 19 and 20. In FIGS. 17 and 18, a "Y" indicates an affirmative determination to the query made by the controller C in the denoted adjacent step, and an "N" indicates a negative determination.

In step 1010, the monitored powertrain operating conditions 1021 may include gear shift lever position or commands, such as from a PRNDL gear lever 1024 shown in FIGS. 19 and 20, or gear commands, such as in a powertrain having other input mechanisms to select a gear. Referring to FIG. 18, based on the gear shift lever position or commands, the controller C determines in sub-step 1028 of step 1025 whether the CVT is in park, neutral or reverse gear mode. For example, a reverse gear mode may be accomplished by a gearing mechanism 893 including one or more selectively engagable torque-transmitting mechanisms that reverses the direction of rotation of the input shaft, such as shaft 824, relative to the crankshaft 811. If the CVT is in the park, neutral or reverse gear mode, then the method 1000 moves from step 1025 to step 1030 in FIG. 17, because at least a portion of the commanded clamping force will need to be contributed by the linear actuator 852, as sufficient wedge force will not be generated given the absence of forward drive torque on the input shaft of the CVT.

If the controller C determines in sub-step 1028 that the CVT is not in the park, neutral or reverse mode, then in sub-step 1032 of step 1025, the controller C determines whether the CVT is in a forward drive mode. If the CVT is not in a forward drive mode, then the method 1000 moves from step 1025 to step 1030. In FIG. 17, because at least a portion of the commanded clamping force will need to be contributed by the linear actuator 852, as sufficient wedge force will not be generated given the absence of forward drive torque on the input shaft of the CVT.

If the controller C determines in sub-step 1032 that the CVT is in forward drive mode, then the method 1000 moves to sub-step 1034 of step 1025 to determine how the monitored powertrain operating conditions 1021 may affect input shaft torque or output shaft torque in the forward drive mode. For example, in sub-step 1034, the controller C determines whether torque of the engine crankshaft (indicated at 811 in FIGS. 19 and 20) of the engine E driving the input shaft of the CVT is negative or idle, or whether an electric machine 493 operatively connected to the engine crankshaft 811 is being operated as a generator, such as during engine braking. FIGS. 19 and 20 show such information being provided as powertrain operating conditions 1021 via sensors, such as speed or load sensors or otherwise. If the controller C determines in sub-step 1034 that torque of the engine crankshaft 811 is negative or idle, or the electric machine 493 operatively connected to the engine crankshaft 811 is being operated as a generator, then the method 1000 moves from step 1025 to step 1030, as the controller C has determined that at least a portion of the commanded clamping force will need to be contributed by the input or output linear actuator 852, because sufficient wedge force will not be generated, for example, due to the absence of sufficient forward drive torque on the input shaft of the CVT. It should be appreciated that the engine E with crankshaft 811 is representative of any of the powertrain embodiments described herein with an engine E having a crankshaft.

If, however, the controller C determines in sub-step 1034 that the torque of the crankshaft 811 is neither negative nor idle, and the electric machine 493 operatively connected to the engine crankshaft is not being operated as a generator, then step 1025 moves to sub-step 1038 to determine whether the brake pedal is on. Referring to FIGS. 19 and 20, a brake pedal 1040 and a gas pedal 1042 are both shown schematically. Position sensors may be used to determine the positions (i.e., amount of depression of the brake pedal and the gas pedal), which are provided to the controller C as some of the powertrain operating conditions 1021. In sub-step 1038, if the controller C determines that the brake pedal 1038 is not on (e.g., not depressed), step 1025 moves from sub-step 1038 to sub-step 1044 in which the controller C determines whether a deceleration rate is high, such as when the rate of depression of the gas pedal is high. In sub-step 1038, if the brake pedal 1040 is determined to be depressed, or if in sub-step 1044 the position of the gas pedal 1042 is determined to have a predetermined high rate of decrease, then step 1025 moves to block 1030 in FIG. 18, as the controller C has determined that the commanded clamping force requires activation of at least one of the input or output linear actuators, as sufficient wedge force will not be generated given the absence of sufficient forward drive torque on the input shaft of the CVT. However, if the controller C determines that the brake pedal 1040 is not on and the rate of decrease of the gas pedal 1042 is not sufficiently high, then the method 1000 moves from step 1025 back to step 1010, and continues to monitor powertrain operating conditions 1021.

In step 1030, the controller C activates at least one of the input actuator and the output actuator (each represented by actuator 852) based on the calculated commanded clamping force such that Equation 2 is satisfied for each of the commanded clamping force at the input pulley and the commanded clamping force at the output pulley. Stated differently, the input linear actuator and/or the output linear actuator are activated in step 1030 such that an axial component of the input wedge force and the axial force of the input actuator together provide the commanded clamping force of the input pulley (Equation 3 below), and an axial component of the output wedge force and the axial force of the output actuator together provide the commanded clamping force of the output pulley (Equation 4 below):

$$F_{clamp\ input}=F_{input\ wedge\ axial}+F_{input\ linear\ actuator} \quad \text{(EQUATION 3)}$$

$$F_{clamp\ output}=F_{output\ wedge\ axial}+F_{output\ linear\ actuator} \quad \text{(EQUATION 4)}$$

With reference to FIG. 16, the axial wedge force 892 of the wedge component 830 can be calculated by the controller C based on the torque 813 on the shaft 824 (as determined by monitoring powertrain operating conditions 1021 in step 1010), and the geometry of the wedge component 830. More specifically, the axial component of the wedge force of each wedge component (input or output) can be calculated as follows:

$$F_{wedge\ axial}=T_{drive}/(R_{wedge}*\tan(\alpha)\cos(\beta)) \quad \text{(EQUATION 5)}$$

where $F_{wedge\ axial}$ is the axial component 892 of the wedge force 92 of the wedge component 830; $T_{drive}$ is the forward drive torque on the shaft 824; $R_{wedge}$ is the radius 829 of the wedge component 830 as measured from the axis of rotation to 817 (corresponding to either the input axis 16 or the output axis 20); α is the angle of the wedge surface 856 relative to the line 93 perpendicular to the axis of rotation 817; and β is the angle of the pulley surface 826E (i.e., the surface in contact with the endless rotatable device 28) relative to the line 97 perpendicular to the axis of rotation 817.

With reference to FIG. 19, in order to achieve the commanded clamping force under step 1030, the controller C executes sub-step 1060 of step 1030, according to Equation 5 for the input wedge component (calculating the axial component of the input wedge force of the input wedge component based on estimated drive torque on the input shaft, an angle of a wedge surface of the input wedge component that interfaces with the input movable sheave, an angle of the pulley surface of the input movable sheave, and an outer radius of the input wedge component), and for the output wedge component component (calculating the axial component of the output wedge force of the output wedge component based on estimated drive torque on the output shaft, an angle of a wedge surface of the output wedge component that interfaces with the output movable sheave, an angle of the pulley surface of the output movable sheave, and an outer radius of the output wedge component).

The controller C then executes sub-step 1065 of step 1030, where sub-step 1065 is distributing the commanded clamping force between the wedge component and the linear actuator, and is carried out for the input wedge component and input linear actuator, and separately for the output wedge component and the output linear actuator. FIGS. 19 and 20 show two different implementations of the method 1000. FIG. 19 represents the method 1000 when the input or output wedge component is not controllable in that it automatically provides a wedge force (and axial component thereof) according to the torque applied on the shaft on which it is mounted, as explained with respect to the various embodiments of FIGS. 10-15. Accordingly, in sub-step 1065, the controller C need only subtract the axial wedge force determined in sub-step 1060 from the commanded clamping force, and activate the linear actuator 852 to apply the difference as axial force 890 of the linear actuator in sub-step 1070 of step 1030. In FIG. 19, the linear actuator 852 is configured for purposes of discussion as a hydraulic actuator. Accordingly, the controller C may include a proportional integral derivative (PID) module 1075 that repeatedly monitors hydraulic pressure, torque, and other of the monitored powertrain operating conditions, and updates the hydraulic pressure required to achieve the linear actuator axial force 890 of sub-step 1070 via the linear actuator 852. In the case of an electric linear actuator such as actuator 454 of FIG. 11, the PID module 1075 would instead monitor and adjust the position of the linear screw based on the feedback.

Figure 21:
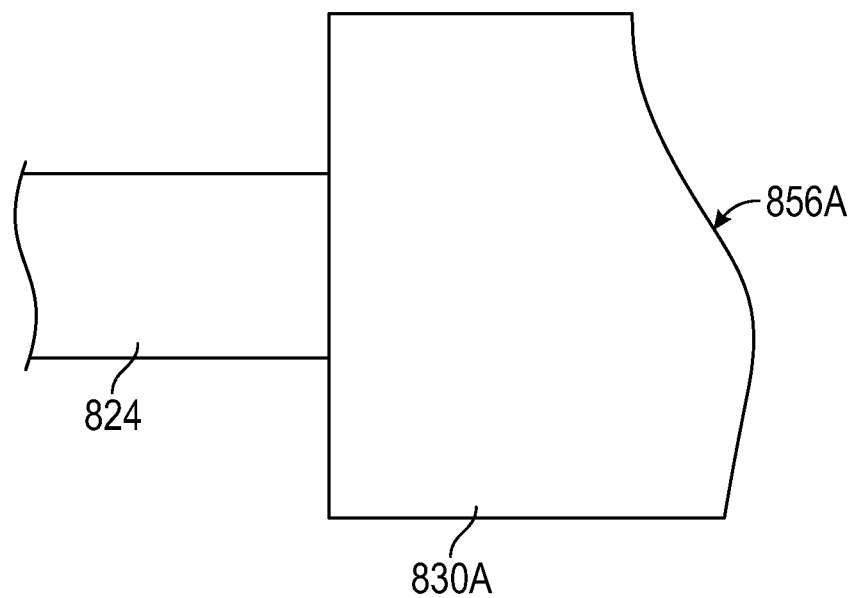
FIG. 21 is a schematic representation of a wedge component for use in the embodiment of FIG. 20.

FIG. 20 shows an implementation of the method 1000 that is alike in all aspects to the implementation shown and described with respect to FIG. 19, except that the sub-steps included in step 1030 are different, as an alternative embodiment of a wedge component 830A (shown in FIG. 21) is used that is configured to be controllable so that the axial component of the wedge force can be varied even under a given drive torque 813 on the shaft 824. For example, the wedge component 830A may be configured with an alternative wedge surface 856A on which the angle α varies along the length of the wedge surface 856A, or the radius of the wedge component may be different at different portions of the circumference of the wedge component. In such an embodiment, the wedge component 830A can be controlled so that differently angled portions of the wedge surface 856A or portions of the wedge surface with differently-sized radii interface with the ramp surface 858, resulting in a wedge axial force that is controllable (variable) even for a given torque on the shaft 824. Accordingly, the distribution of the calculated clamping force command 1110, as distributed under the distribution sub-step 1065 of step 1030, may be based on other factors, such as optimizing a ratio of wedge axial force to linear actuator force for transmission efficiency or otherwise, and an axial wedge force can be commanded in sub-step 1067 of step 1030. A wedge control module 1068 of the electronic controller C responds to the control signal for the commanded axial wedge force to control the wedge component 830 to provide the commanded axial wedge force, and may also respond to feedback of powertrain operating conditions 1021, including hydraulic pressure in case the controllable wedge component 830A is hydraulically actuated. The controllably actuated wedge actuator 830A and the controllable linear actuator 852, activated to apply the linear axial force calculated in sub-step 1070 (as the difference between the commanded clamping force and the axial wedge force of sub-step 1067), thus both contribute to achieving the commanded clamping force.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A method of controlling a continuously variable transmission (CVT) included in a powertrain; wherein the CVT includes:
an input wedge component mounted on an input shaft, wherein the input wedge component is configured to provide an input wedge force on an input movable sheave of an input pulley when a direction of drive torque on the input shaft is in a forward drive direction;
an output wedge component mounted on an output shaft, wherein the output wedge component is configured to provide an output wedge force on an output movable sheave of an output pulley when a direction of load torque on the output shaft is opposite to the forward drive direction, the output pulley connected with the input pulley via an endless rotatable device;
an input actuator operable to provide an axial force on the input movable sheave; and
an output actuator operable to provide an axial force on the output movable sheave;
the method comprising:
monitoring powertrain operating conditions;
calculating, via an electronic controller, a commanded clamping force based on the powertrain operating conditions, wherein the commanded clamping force includes a commanded clamping force of the input pulley on the endless rotatable device, and a commanded clamping force of the output pulley on the endless rotatable device;
calculating an axial component of the input wedge force of the input wedge component based on estimated drive torque on the input shaft, an angle of a wedge surface of the input wedge component that interfaces with the input movable sheave, an angle of a pulley surface of the input movable sheave, and an outer radius of the input wedge component; and
activating, via the electronic controller, at least one of the input actuator and the output actuator such that the axial component of the input wedge force and the axial force of the input actuator together provide the commanded clamping force of the input pulley, and an axial component of the output wedge force and the axial force of the output actuator together provide the commanded clamping force of the output pulley.

2. The method of claim 1, wherein the powertrain includes an engine operable to provide drive torque on the input shaft, and an electric machine operatively connected to the engine; and
wherein monitoring powertrain operating conditions includes monitoring at least one of engine torque and a mode of operation of the electric machine.

3. The method of claim 2, wherein the powertrain includes a gearing arrangement connected between the engine and the input shaft and operable to reverse a direction of drive torque on the input shaft during a reverse operating mode; and
wherein monitoring powertrain operating conditions includes monitoring the direction of the drive torque on the input shaft.

4. The method of claim 1, wherein monitoring powertrain operating conditions includes monitoring a position of a gear shift lever.

5. The method of claim 1, wherein monitoring powertrain operating conditions includes monitoring a braking and deceleration of a vehicle propelled by the powertrain.

6. The method of claim 1, wherein the input wedge force is measured via a force sensor mounted on the wedge surface of the input wedge component that interfaces with the input movable sheave of the input pulley.

7. The method of claim 1, wherein the angle of the wedge surface varies along a length of the wedge surface; and
wherein activating the at least one of the input actuator and the output actuator includes positioning differently angled portions of the wedge surface against a ramp surface of the movable input sheave to control the axial component of the input wedge force.

8. The method of claim 1, wherein monitoring powertrain operating conditions includes monitoring one or more of torque on the input shaft, torque on the output shaft, rotational speed of the input shaft, rotational speed of the output shaft, position of the endless rotatable device on the input pulley, position of the endless rotatable device on the output pulley, and transmission slip.

9. The method of claim 1, wherein at least one of the input actuator and the output actuator is a hydraulic actuator; and further comprising:
monitoring hydraulic pressure supplied to the hydraulic actuator.

10. The method of claim 1, wherein at least one of the input actuator and the output actuator is an electric linear screw; and further comprising:
adjusting a position of the linear screw.

11. A powertrain comprising:
a continuously variable transmission (CVT) that includes:
an input wedge component mounted on an input shaft; wherein the input wedge component is configured to provide an input wedge force on an input movable sheave of an input pulley when a direction of drive torque on the input shaft is in a forward drive direction;
an output wedge component mounted on an output shaft; wherein the output wedge component is configured to provide an output wedge force on an output movable sheave of an output pulley when a direction of load torque on the output shaft is opposite to the forward drive direction, the output pulley connected with the input pulley via an endless rotatable device;
an input actuator operable to provide an axial force on the input movable sheave; and
an output actuator operable to provide an axial force on the output movable sheave; and
an electronic controller operatively connected to the CVT and configured to:
monitor powertrain operating conditions;
calculate a commanded clamping force based on the powertrain operating conditions; wherein the commanded clamping force includes a commanded clamping force of the input pulley on the endless rotatable device, and a commanded clamping force of the output pulley on the endless rotatable device;
calculate an axial component of the input wedge force of the input wedge component based on estimated drive torque on the input shaft, an angle of a wedge surface of the input wedge component that interfaces with the input movable sheave, an angle of a pulley surface of the input movable sheave, and an outer radius of the input wedge component; and
activate at least one of the input actuator and the output actuator such that the axial component of the input wedge force and the axial force of the input actuator together provide the commanded clamping force of the input pulley, and an axial component of the output wedge force and the axial force of the output actuator together provide the commanded clamping force of the output pulley.

12. The powertrain of claim 11, wherein:
the powertrain includes an engine operable to provide drive torque on the input shaft, and an electric machine operatively connected to the engine; and
the powertrain operating conditions monitored by the controller include at least one of engine torque and a mode of operation of the electric machine as a generator during engine braking.

13. The powertrain of claim 12, wherein:
the powertrain includes a gearing arrangement connected between the engine and the input shaft and operable to reverse the direction of drive torque on the input shaft during a reverse operating mode; and
the powertrain operating conditions monitored by the controller include the direction of drive torque on the input shaft.

14. The powertrain of claim 11, wherein:
the powertrain includes a gear shift lever; and
the powertrain operating conditions monitored by the controller include a position of the gear shift lever.

15. The powertrain of claim 11, further comprising:
a force sensor mounted on the wedge surface of the input wedge component that interfaces with the input movable sheave of the input pulley;
wherein the electronic controller is operatively connected to the force sensor and is configured to determine the input wedge force via the force sensor.

16. The powertrain of claim 11, wherein:
the wedge surface is disposed at an angle to an axis of rotation of the input shaft; wherein the angle varies along a length of the wedge surface; and
the electronic controller is configured to activate the at least one of the input actuator and the output actuator by positioning differently angled portions of the wedge surface against a ramp surface of the movable input sheave to control the axial component of the input wedge force.

17. The powertrain of claim 11, wherein the powertrain operating conditions monitored by the electronic controller include one or more of torque on the input shaft, torque on the output shaft, rotational speed of the input shaft, rotational speed of the output shaft, position of the endless rotatable device on the input pulley, position of the endless rotatable device on the output pulley, and transmission slip.

18. The powertrain of claim 11, wherein the input actuator includes a rotary piston with a radially-extending movable vane, a radially-extending stationary vane, and a fluid-chamber extending between the radially-extending movable vane and the radially-extending stationary vane and configured to be pressurized by a fluid.

19. A powertrain comprising:
a continuously variable transmission (CVT) that includes:
an input wedge component mounted on an input shaft; wherein the input wedge component is configured to provide an input wedge force on an input movable sheave of an input pulley when a direction of torque on the input shaft is in a forward drive direction;
an output wedge component mounted on an output shaft; wherein the output wedge component is configured to provide an output wedge force on an output movable sheave of an output pulley when a direction of load torque on the output shaft is opposite to the forward drive direction, the output pulley connected with the input pulley via an endless rotatable device;
an input actuator operable to provide an axial force on the input movable sheave;
an output actuator operable to provide an axial force on the output movable sheave;
a force sensor mounted on a wedge surface of the input wedge component that interfaces with the input movable sheave of the input pulley; and
an electronic controller operatively connected to the CVT and configured to:
monitor powertrain operating conditions;
calculate a commanded clamping force based on the powertrain operating conditions; wherein the commanded clamping force includes a commanded clamping force of the input pulley on the endless rotatable device, and a commanded clamping force of the output pulley on the endless rotatable device;

determine the input wedge force via the force sensor; and activate at least one of the input actuator and the output actuator such that an axial component of the input wedge force and the axial force of the input actuator together provide the commanded clamping force of the input pulley, and an axial component of the output wedge force and the axial force of the output actuator together provide the commanded clamping force of the output pulley.

* * * * *